US009457355B2

(12) United States Patent
Conrad et al.

(10) Patent No.: US 9,457,355 B2
(45) Date of Patent: Oct. 4, 2016

(54) APPARATUS FOR CONVERTING BALES OF INSULATION TO LOOSE FILL

(75) Inventors: Wayne Ernest Conrad, Hampton (CA); Scott Card, Whitby (CA); Gerry Bowman, Newcastle (CA); Jeff Zajac, Peterborough (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 593 days.

(21) Appl. No.: 13/606,923

(22) Filed: Sep. 7, 2012

(65) Prior Publication Data

US 2013/0068866 A1    Mar. 21, 2013

Related U.S. Application Data

(60) Provisional application No. 61/535,538, filed on Sep. 16, 2011.

(51) Int. Cl.

| | |
|---|---|
| *B02C 13/00* | (2006.01) |
| *B02C 21/02* | (2006.01) |
| *B02C 13/10* | (2006.01) |
| *B02C 13/06* | (2006.01) |
| *B02C 18/00* | (2006.01) |
| *B02C 18/14* | (2006.01) |
| *B02C 18/22* | (2006.01) |
| *B02C 18/24* | (2006.01) |

(Continued)

(52) U.S. Cl.
CPC .............. *B02C 21/02* (2013.01); *A01F 29/005* (2013.01); *B02C 13/06* (2013.01); *B02C 13/10* (2013.01); *B02C 18/0092* (2013.01); *B02C 18/142* (2013.01); *B02C 18/2225* (2013.01); *B02C 18/24* (2013.01); *B02C 23/18* (2013.01); *A01F 29/00* (2013.01)

(58) Field of Classification Search
CPC ... B02C 13/06; B02C 13/2804; B02C 13/10; B02C 1/04; B02C 13/00; B02C 4/10; B02C 13/18; C13B 5/08; B01F 7/02; A01D 2087/128; A01F 29/005
USPC ......... 241/605, 134, 154, 165.5, 186.2, 277, 241/191
See application file for complete search history.

(56) References Cited

U.S. PATENT DOCUMENTS

| | | | |
|---|---|---|---|
| 1,418,882 | A | 6/1922 | Roka |
| 1,630,542 | A | 5/1927 | Schulz |
| 1,718,507 | A | 6/1929 | Wenzel et al. |

(Continued)

FOREIGN PATENT DOCUMENTS

| | | |
|---|---|---|
| DE | 3238492 A1 | 4/1984 |
| DE | 3240126 A1 | 5/1984 |

(Continued)

*Primary Examiner* — Faye Francis
(74) *Attorney, Agent, or Firm* — Philip C. Mendes da Costa; Bereskin & Parr LLP/S.E.N.C.R.L., s.r.l.

(57) ABSTRACT

A machine for de-aggregating a bale of insulation and blowing de-aggregated insulation, has a single upper de-aggregation member and a single lower de-aggregation member, each de-aggregation member having a rotary mounted shaft having a length and a plurality of paddles angularly staggered around the shaft and extending along the length of the shaft, the paddles of the upper de-aggregation member have first and second paddles having differing lengths and both the first and second paddles are interleaved with the paddles of the lower de-aggregation member.

16 Claims, 33 Drawing Sheets

(51) Int. Cl.
*B02C 23/18* (2006.01)
*A01F 29/00* (2006.01)

(56) References Cited

U.S. PATENT DOCUMENTS

| | | | |
|---|---|---|---|
| 1,811,898 A | 6/1931 | Schur et al. | |
| 2,049,063 A | 7/1936 | Hubbard | |
| 2,057,121 A | 10/1936 | Trevellyan | |
| 2,057,122 A | 10/1936 | Trevellyan | |
| 2,193,849 A | 3/1940 | Whitfield | |
| 2,200,713 A | 5/1940 | Ericson et al. | |
| 2,235,542 A | 3/1941 | Wenzel | |
| 2,262,094 A | 11/1941 | Burt | |
| 2,276,962 A | 3/1942 | Granstedt | |
| 2,291,871 A | 8/1942 | Bokum et al. | |
| 2,308,197 A | 1/1943 | Meyer | |
| 2,311,773 A | 2/1943 | Patterson | |
| 2,355,358 A | 8/1944 | Anderson | |
| 2,404,678 A | 7/1946 | Wuensch | |
| 2,437,831 A | 3/1948 | Moore | |
| 2,532,318 A | 12/1950 | Mackey et al. | |
| 2,532,351 A | 12/1950 | Wedebrock | |
| 2,550,354 A | 4/1951 | Jacobsen | |
| 2,618,817 A | 11/1952 | Slayter | |
| 2,721,767 A | 10/1955 | Kropp | |
| 2,754,995 A | 7/1956 | Switzer | |
| 2,794,454 A | 6/1957 | Moulthrop | |
| 2,869,793 A | 1/1959 | Montgomery | |
| 2,879,904 A * | 3/1959 | Walsh et al. | 198/494 |
| 2,938,651 A | 5/1960 | Specht et al. | |
| 2,964,896 A | 12/1960 | Finocchiaro | |
| 2,984,872 A | 5/1961 | France | |
| 2,989,252 A | 6/1961 | Babb | |
| 3,051,398 A | 8/1962 | Babb | |
| 3,061,206 A | 10/1962 | Matter | |
| 3,076,659 A | 2/1963 | Kremer, Jr. | |
| 3,171,692 A | 3/1965 | Beery | |
| 3,175,866 A | 3/1965 | Nichol | |
| 3,201,007 A | 8/1965 | Transeau | |
| 3,231,105 A | 1/1966 | Easley, Jr. | |
| 3,278,013 A | 10/1966 | Banks | |
| 3,314,732 A | 4/1967 | Hagan | |
| 3,399,931 A | 9/1968 | Vogt | |
| 3,401,701 A * | 9/1968 | Pietrucci | 131/312 |
| 3,403,942 A | 10/1968 | Farnworth | |
| 3,485,645 A | 12/1969 | MacKenzie et al. | |
| 3,512,645 A | 5/1970 | Rosaen | |
| 3,556,355 A | 1/1971 | Ruiz | |
| 3,591,444 A | 7/1971 | Hoppe | |
| 3,703,970 A | 11/1972 | Benson | |
| 3,747,743 A | 7/1973 | Hoffmann, Jr. | |
| 3,861,599 A | 1/1975 | Waggoner | |
| 3,869,337 A | 3/1975 | Hoppe et al. | |
| 3,895,745 A | 7/1975 | Hook | |
| 3,952,757 A | 4/1976 | Huey | |
| 3,995,775 A | 12/1976 | Birkmeier et al. | |
| 4,000,860 A * | 1/1977 | Gotham | B02C 18/148 241/222 |
| 4,059,205 A | 11/1977 | Heyl | |
| 4,129,338 A | 12/1978 | Mudgett | |
| 4,133,542 A | 1/1979 | Janian et al. | |
| 4,134,508 A | 1/1979 | Burdett, Jr. | |
| 4,155,486 A | 5/1979 | Brown | |
| 4,179,043 A | 12/1979 | Fischer | |
| 4,180,188 A | 12/1979 | Aonuma et al. | |
| 4,236,654 A | 12/1980 | Mello | |
| 4,268,205 A | 5/1981 | Vacca et al. | |
| 4,273,296 A | 6/1981 | Hoshall | |
| 4,337,902 A | 7/1982 | Markham | |
| 4,344,580 A | 8/1982 | Hoshall et al. | |
| 4,346,140 A | 8/1982 | Carlson et al. | |
| 4,365,762 A | 12/1982 | Hoshall | |
| 4,381,082 A | 4/1983 | Elliott et al. | |
| 4,385,477 A | 5/1983 | Walls et al. | |
| 4,411,390 A | 10/1983 | Woten | |
| 4,465,239 A | 8/1984 | Woten | |
| 4,536,121 A | 8/1985 | Stewart et al. | |
| 4,537,333 A | 8/1985 | Bjerregaard | |
| 4,560,307 A | 12/1985 | Deitesfeld | |
| 4,585,239 A | 4/1986 | Nicholson | |
| 4,640,082 A | 2/1987 | Gill | |
| 4,695,501 A | 9/1987 | Robinson | |
| 4,716,712 A | 1/1988 | Gill | |
| 4,784,298 A | 11/1988 | Heep et al. | |
| 4,880,150 A | 11/1989 | Navin et al. | |
| 4,915,265 A | 4/1990 | Heep et al. | |
| 4,919,403 A | 4/1990 | Bartholomew | |
| 4,938,425 A * | 7/1990 | Williams | A01F 29/10 241/101.77 |
| 4,951,883 A * | 8/1990 | Loppoli et al. | 241/101.762 |
| 4,978,252 A * | 12/1990 | Sperber | 406/64 |
| 5,014,885 A | 5/1991 | Heep et al. | |
| 5,037,014 A | 8/1991 | Bliss | |
| 5,052,288 A | 10/1991 | Marquez et al. | |
| 5,114,281 A | 5/1992 | Hartnett | |
| 5,129,554 A | 7/1992 | Futamura | |
| 5,156,499 A | 10/1992 | Miklich | |
| 5,166,236 A | 11/1992 | Alexander et al. | |
| 5,289,982 A | 3/1994 | Andersen | |
| 5,303,672 A | 4/1994 | Morris | |
| 5,323,819 A | 6/1994 | Shade | |
| 5,365,716 A | 11/1994 | Munson | |
| 5,367,849 A | 11/1994 | Bullock | |
| 5,368,311 A | 11/1994 | Heyl | |
| 5,380,094 A | 1/1995 | Schmidt et al. | |
| 5,392,964 A | 2/1995 | Stapp et al. | |
| 5,405,231 A | 4/1995 | Kronberg | |
| 5,462,238 A | 10/1995 | Smith et al. | |
| 5,472,305 A | 12/1995 | Ikeda et al. | |
| 5,511,730 A | 4/1996 | Miller et al. | |
| 5,601,239 A | 2/1997 | Smith et al. | |
| 5,620,116 A | 4/1997 | Kluger et al. | |
| 5,624,742 A | 4/1997 | Babbitt et al. | |
| 5,639,033 A | 6/1997 | Miller et al. | |
| 5,642,601 A | 7/1997 | Thompson, Jr. et al. | |
| 5,647,696 A * | 7/1997 | Sperber | E04F 21/12 198/575 |
| 5,683,810 A | 11/1997 | Babbitt et al. | |
| 5,750,225 A | 5/1998 | Petty | |
| 5,819,991 A | 10/1998 | Kohn et al. | |
| 5,829,649 A | 11/1998 | Horton | |
| 5,860,232 A | 1/1999 | Nathenson et al. | |
| 5,860,606 A | 1/1999 | Tiedeman et al. | |
| 5,921,055 A | 7/1999 | Romes et al. | |
| 5,927,558 A | 7/1999 | Bruce | |
| 5,934,809 A | 8/1999 | Marbler | |
| 5,947,646 A | 9/1999 | Lytle | |
| 5,987,833 A | 11/1999 | Heffelfinger et al. | |
| 5,997,220 A | 12/1999 | Wormser | |
| 6,004,023 A | 12/1999 | Koyanagi et al. | |
| 6,036,060 A | 3/2000 | Munsch et al. | |
| 6,070,814 A | 6/2000 | Deitesfeld | |
| 6,074,795 A | 6/2000 | Watanabe et al. | |
| 6,109,488 A | 8/2000 | Horton | |
| 6,161,784 A * | 12/2000 | Horton | 239/654 |
| 6,209,724 B1 | 4/2001 | Miller | |
| 6,266,843 B1 | 7/2001 | Doman et al. | |
| 6,296,424 B1 | 10/2001 | Eckel et al. | |
| 6,312,207 B1 | 11/2001 | Rautiainen | |
| 6,443,378 B1 * | 9/2002 | Huang | A47J 42/02 241/169.1 |
| 6,503,026 B1 | 1/2003 | Mitchell | |
| 6,510,945 B1 | 1/2003 | Allwein et al. | |
| 6,578,784 B1 | 6/2003 | Lischynski et al. | |
| 6,648,022 B2 | 11/2003 | Pentz et al. | |
| 6,698,458 B1 | 3/2004 | Sollars, Jr. et al. | |
| 6,779,691 B2 | 8/2004 | Cheng | |
| 6,783,154 B2 | 8/2004 | Persson et al. | |
| 6,796,748 B1 | 9/2004 | Sperber | |
| 6,826,991 B1 | 12/2004 | Rasmussen | |
| 7,284,715 B2 | 10/2007 | Dziesinski et al. | |
| 7,354,466 B2 | 4/2008 | Dunning et al. | |
| 7,520,459 B2 | 4/2009 | O'Leary | |
| 7,731,115 B2 * | 6/2010 | Johnson et al. | 241/101.8 |

(56) References Cited

U.S. PATENT DOCUMENTS

| | | | |
|---|---|---|---|
| 7,735,755 B2 | 6/2010 | Near | |
| 7,971,813 B2 * | 7/2011 | O'Leary | B02C 18/2216 241/18 |
| 7,971,814 B2 * | 7/2011 | Evans | B02C 23/30 241/60 |
| 8,894,811 B1 * | 11/2014 | Brown | D21H 13/40 162/145 |
| 9,272,287 B2 * | 3/2016 | O'Leary | B02C 18/2216 |
| 2001/0036411 A1 | 11/2001 | Walker | |
| 2002/0074436 A1 | 6/2002 | Hruska | |
| 2003/0075629 A1 | 4/2003 | Lucas et al. | |
| 2003/0192589 A1 | 10/2003 | Jennings | |
| 2003/0215165 A1 | 11/2003 | Hogan et al. | |
| 2003/0234264 A1 | 12/2003 | Landau | |
| 2004/0124262 A1 | 7/2004 | Bowman et al. | |
| 2005/0006508 A1 | 1/2005 | Roberts | |
| 2005/0242221 A1 | 11/2005 | Rota | |
| 2006/0024456 A1 | 2/2006 | O'Leary et al. | |
| 2006/0024457 A1 | 2/2006 | O'Leary et al. | |
| 2006/0024458 A1 | 2/2006 | O'Leary et al. | |
| 2006/0231651 A1 | 10/2006 | Evans et al. | |
| 2007/0138211 A1 | 6/2007 | O'Leary et al. | |
| 2008/0087751 A1 | 4/2008 | Johnson et al. | |
| 2010/0133370 A1 * | 6/2010 | Flynn | B02C 23/20 241/46.01 |
| 2010/0219274 A1 | 9/2010 | Johnson et al. | |
| 2011/0000990 A1 | 1/2011 | Johnson | |

FOREIGN PATENT DOCUMENTS

| | | |
|---|---|---|
| EP | 0265751 A1 | 4/1988 |
| GB | 1418882 | 12/1975 |
| GB | 1574027 | 9/1980 |
| GB | 2099776 A | 12/1982 |
| GB | 2124194 A | 2/1984 |
| GB | 2156303 A | 10/1985 |
| GB | 2212471 A | 7/1989 |
| GB | 2276147 A | 9/1994 |
| JP | 07088985 | 4/1995 |
| NL | 8204888 | 7/1984 |

* cited by examiner

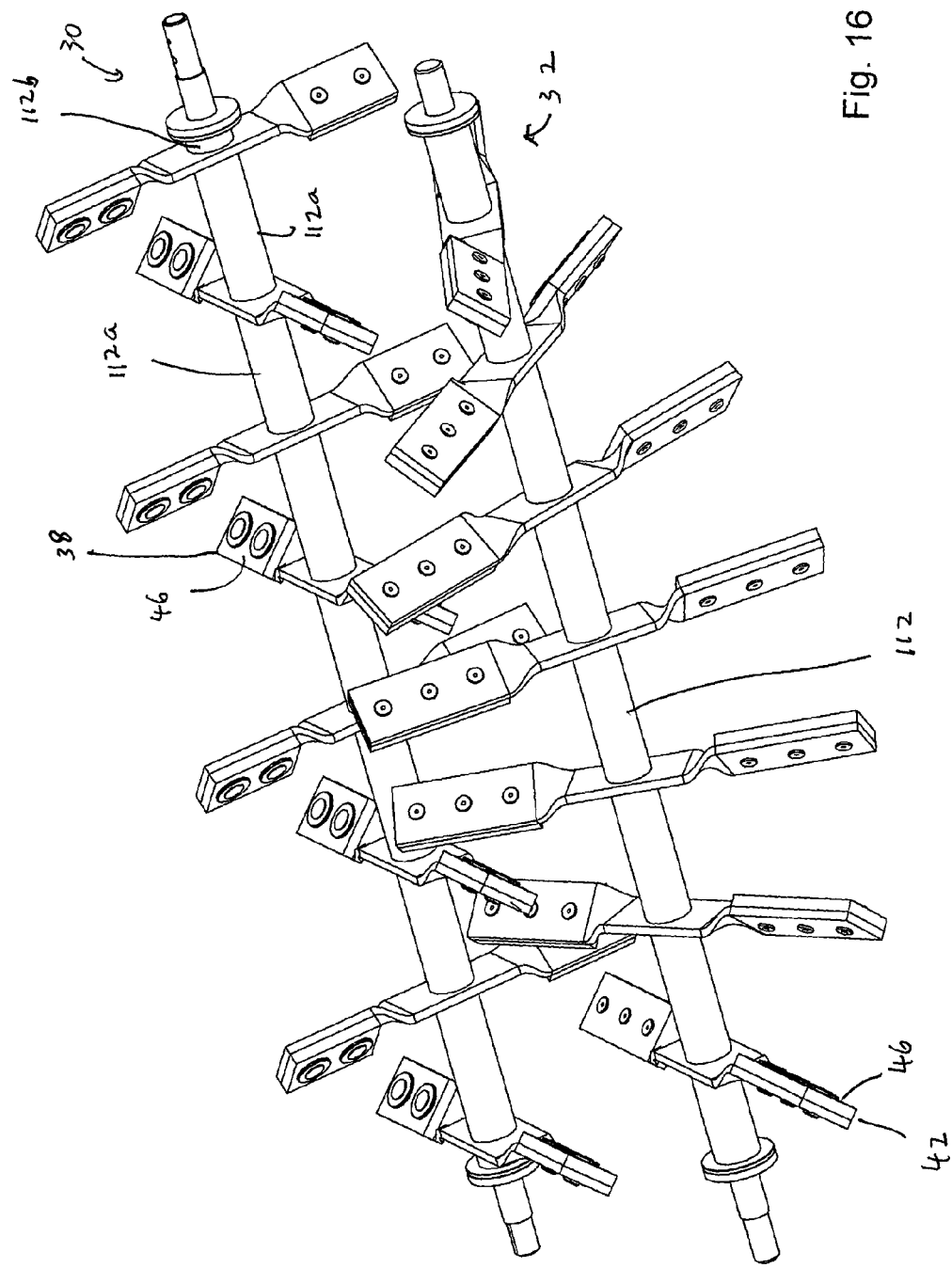

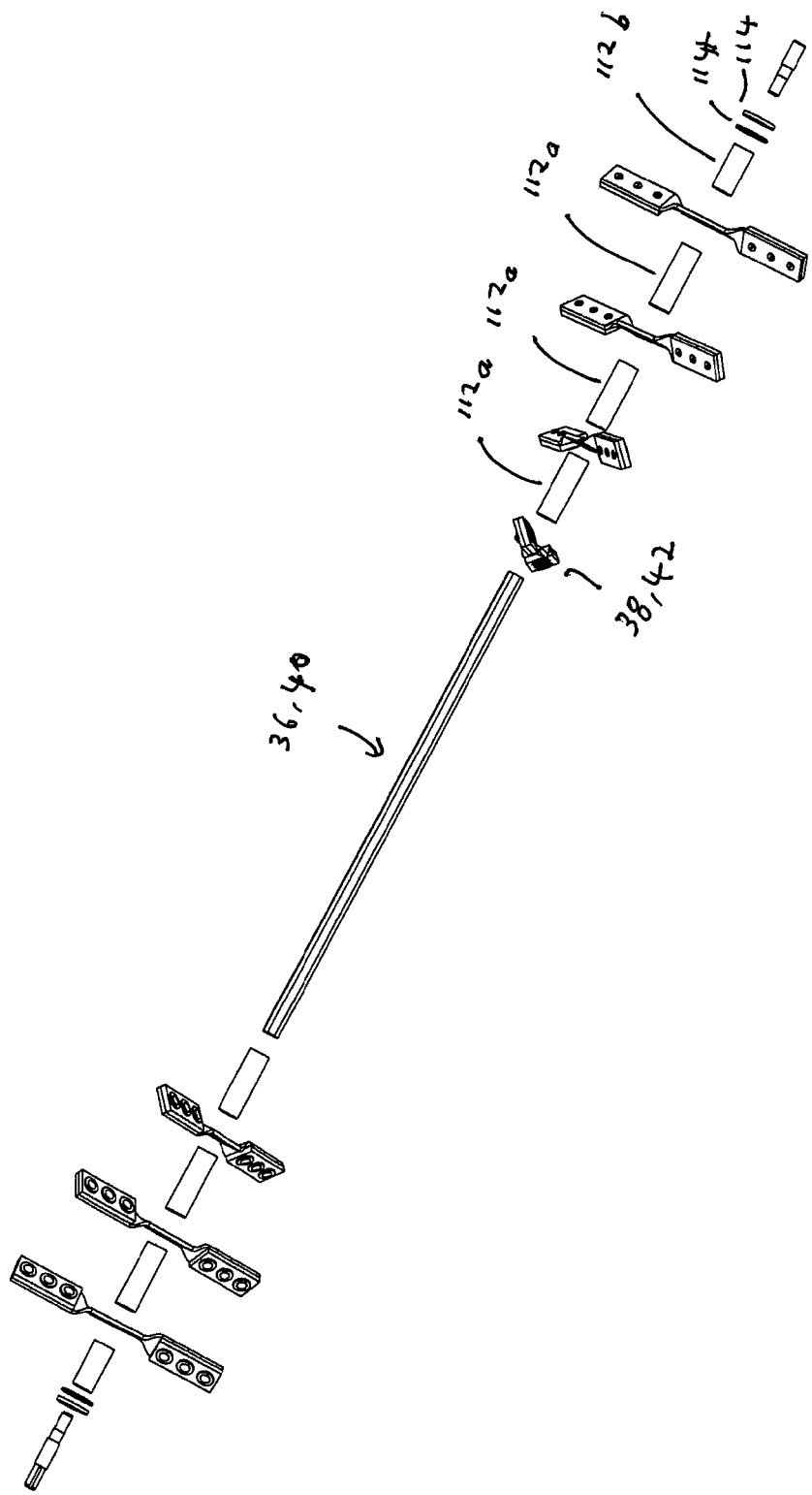

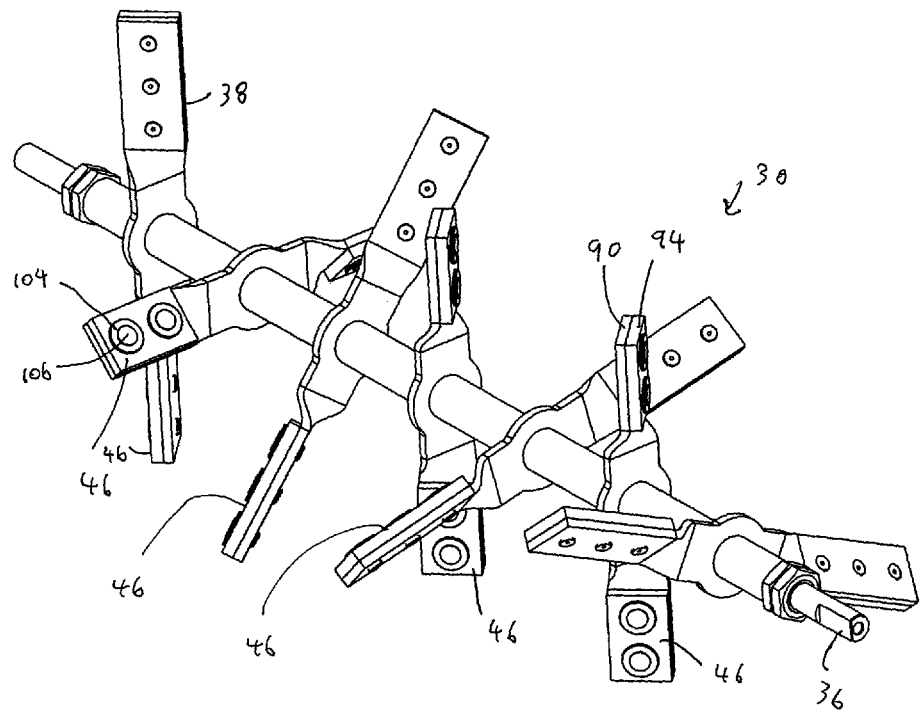
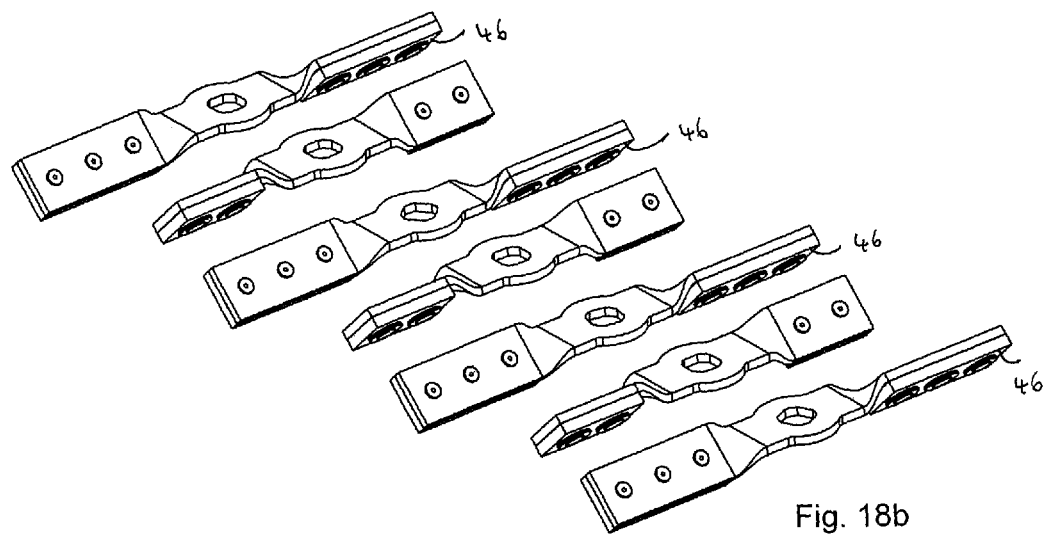
Fig. 18b

APPARATUS FOR CONVERTING BALES OF INSULATION TO LOOSE FILL

This application claims priority from U.S. provisional application No. 61/535,538, the disclosure of which is incorporated herein in its entirety.

FIELD

This disclosure relates to machines for de-aggregating bales of loose fill insulation. In a preferred embodiment, this disclosure relates to machines for de-aggregating bales of loose fill insulation and for blowing the de-aggregated insulation for use, e.g. for insulating buildings and the like.

BACKGROUND

Frequently, loose fill insulation is utilized to insulate sections of a building, such as walls or the attic. Loose fill insulation may be used as a replacement for insulation bats. The problem with insulation bats is that they can be difficult to manipulate into a required space and may require cutting to fit into place. In addition, insulation bats may not be suitable when insulating an existing structure. For example, loose fill insulation may be utilized to insulate an existing structure, such as the walls of a building.

Loose fill insulation, which is typically made of glass fibers, is typically compressed into bales which are packaged e.g. by being placed into a plastic bag. This facilitates the transportation of the insulation from the manufacturing site to the site at which the insulation will be utilized. The insulation is typically compressed when packaged and, accordingly, the volume of material that has to be transported may be substantially reduced. However, the compressed insulation must be decompressed or expanded in order to allow the insulation to be blown and utilized at a building site.

A number of different methods for breaking up bales of insulation and blowing the insulation are known. See for example U.S. Pat. No. 7,731,115; US 2006/0231651; US 2010/0219274; U.S. Pat. Nos. 7,520,459; 6,503,026; 6,109,488; 5,860,606; 5,829,649; 4,560,307; 4,337,902; 4,236,654; 4,411,390; 3,171,692; 3,061,206; 3,051,398; 2,989,252; and, GB 2,124,194.

SUMMARY

In accordance with this specification various improvements in the design of a machine for de-aggregating insulation and blowing the de-aggregated insulation are disclosed. Advantageously, machines disclosed herein utilize rotor configurations alone or in combination with the configuration within the interior of the de-aggregation chamber to provide an improved de-aggregation of the insulation in the bale. It will be appreciated that if the insulation is not fully de-aggregated, then clumps of compressed insulation may be present in the de-aggregated insulation. These clumps may clog the machine. In order for the blown insulation to have the desired density and thermal insulation properties, the insulation should be fully de-aggregated without damage or substantial damage to the fibers making up the bale of insulation. If clumps or insulation are present in the blown product, then the desired thermal insulation value may not be obtained.

In addition, in order to achieve the desired density and thermal insulation properties, the fibers of the insulation should be sufficiently separated so that a desired density can be obtained when the insulation is blown without the insulation becoming compacted during its passage through the machine and the downstream delivery system (e.g. a flexible hose and/or wand).

In accordance with one embodiment, which may be used by itself or with any one or more of the other embodiments set out herein, a machine for de-aggregating a bale of insulation utilizes a single upper de-aggregation member to maintain the bale in the generally horizontally disposed position as the bale is de-aggregated. An advantage of this design is that the entire lower surface of the bale is exposed to the rotors as opposed to only an edge. In some designs, e.g. O'Leary (U.S. Pat. No. 7,520,459), the bale is introduced at an angle. Accordingly, the upper router will not contact the entire lower surface of the bale but will engage one edge of the bale. In contrast, by maintaining the bale in the generally horizontally disposed position, equal sections of the bale are continually removed, resulting in a continual load placed on the routers and a more even amount of insulation which passes downwardly through the machine to the discharge zone.

In order to maintain the bale generally horizontally, an upper guide member may be provided which has an upper surface extending inwardly and downwardly. Preferably, the guide member extends inwardly a sufficient amount so that a portion of the bale may rest thereon thereby preventing all of the weight of the bale from being positioned on the rotors or paddles. In addition, the guide member and/or the horizontal cross sectional area of the entrance zone above the aggregation member may be configured to inhibit rotation of the bale that the paddles engage. Accordingly, the bale is kept in an upright position so as to continually expose a generally horizontal surface to the routers.

The angular staggering of the paddles may also be utilized to maintain the bale generally horizontally. The upper de-aggregation member may comprise a rotary shaft having a plurality of paddles angularly staggered around the shaft. The shaft has a notional center point half way along its length. The paddles may be configured such that only one paddle on either side of the centerline is fully embedded in the bale at any one time or a single paddle that has a blade portion that traverses the centerline as the paddles rotates through the bale at any one time. The paddles adjacent to such an engaging paddle may contact the bale and be partially embedded therein. As such, the adjacent paddles may assist in steadying the bale as the engaging paddle passes through the bale. An advantage of this design is that the paddles are positioned so as to essentially keep the bale horizontal as portions of the bale are removed. In addition, a limited number of paddles engage the bale at any one time reducing the load on the motor.

In accordance with an alternate embodiment, which may be used by itself or with any one or more of the other embodiments set out herein, a machine for de-aggregating a bale of insulation utilizes an upper de-aggregation member and a lower counter-rotating de-aggregation member. Each de-aggregation member comprises a rotary mounted shaft having a plurality of paddles thereon. The paddles of the lower de-aggregation member are preferably interleaved only with the paddles of the upper de-aggregation member. Preferably, paddles of the upper de-aggregation member pass between a pair of paddles of the lower de-aggregation member. This interleaving action of the paddles assists in pulling the fibers of the compacted insulation apart so as to de-aggregate the fibers. In addition, an upper and/or lower guide member may be provided to enhance recirculation of the insulation as it passes downwardly through the paddles.

The guide members result in the insulation passing more than once through the interleaving upper and lower paddles thereby producing an enhanced de-aggregated product.

In accordance with another embodiment, which may be used by itself or with any one or more of the other embodiments set out herein, a machine for de-aggregating a bale of insulation utilizes a de-aggregating chamber having an upper de-aggregation member and a single lower counter-rotating de-aggregation member wherein the de-aggregation chamber is configured to inhibit compaction of the de-aggregated insulation as de-aggregated insulation travels downwardly to a discharge zone. Accordingly, the de-aggregation chamber preferably has a horizontal cross-sectional area that is generally constant along the height of the de-aggregation chamber. Further, the de-aggregation members each preferably extend along the entire extent of the chamber and are at least as long as the bale of insulation. Accordingly, the bale of insulation is exposed to paddles along its entire length. Insulation which is removed from the bale may fall downwardly (as opposed to being moved laterally to one side of the machine). Further, the discharge zone preferably comprises a rotary valve wherein the upper inlet of the rotary valve preferably also extends across the entire length of the de-aggregation chamber.

Accordingly, the aggregated insulation may fall downwardly into the rotary valve across the entire length of the rotary valve. The ability of the insulation to fall downwardly at any position along the length of the machine inhibits the compaction of the insulation which would occur if the inlet to the rotary valve was provided at only one end of the machine as in Horton (U.S. Pat. No. 6,109,488) and Horton (U.S. Pat. No. 5,829,649).

In accordance with another embodiment, which may be used by itself or with any one or more of the other embodiments set out herein, a machine for de-aggregating a bale of insulation has a de-aggregation chamber and a discharge zone comprising the rotary valve positioned below the discharge zone. A choke is positioned at the insulation inlet to the rotary valve and is configured to cause some of the insulation to recirculate to the de-aggregation chamber. The insulation inlet to the rotary valve is positioned directly below the de-aggregation member (e.g., a lower de-aggregation member in a de-aggregation chamber). Accordingly, the insulation inlet is positioned such that insulation may fall downwardly from the lower de-aggregation member directly into the inlet to the rotary valve. The choke is preferably curved upwardly so as to redirect some of the insulation back to the de-aggregation chamber. In a particularly preferred embodiment, the choke is utilized in combination with a lower guide member to enhance the re-circulation of insulation. The enhanced re-circulation of insulation assists in producing a de-aggregated insulation which has a more uniform density.

In accordance with another embodiment of this disclosure, which may be used by itself or in combination of any one or more other embodiments of this disclosure, a machine for de-aggregating a bale of insulation has an insulation feed inlet which is configured to enable a bale of insulation to be positioned horizontally above the de-aggregation members. This enables the de-aggregation members in the de-aggregation chamber to uniformly engage the bale along the length of the bale. Further, it enables the bale to present a generally horizontal surface to the de-aggregation members thereby allowing the bale to be more evenly broken up along the surface. Accordingly, the feeder which is utilized may be a pivotally openable door which is rotatable downwardly to essentially a horizontal position (e.g. within 20° and, preferably, within 10° of horizontal). Further, the inlet of the feeder may have a height which is at least the same as the height of the bale which has expanded after being removed from its packaging. Accordingly, the bale may be slid horizontally into an entrance zone of the machine which is positioned above the de-aggregation members.

In accordance with another embodiment of this disclosure, which may be used itself or in combination with any of one or more embodiments of this disclosure, a machine for de-aggregating a bale of insulation utilizes a de-aggregation member comprises a plurality of paddles which have a leading edge in the direction of rotation wherein the leading edge is provided with a cover layer of, e.g., rubber, synthetic rubber, silicone or mixtures thereof. The cover layer provides a surface having a higher co-efficient of friction with respect to the fibers of the insulation. Accordingly, the paddles have an enhanced ability to grip and pull the fibers apart. This action is enhanced if, preferably, upper and lower de-aggregation members are utilized wherein the paddles of the upper de-aggregation member are interleaved between two paddles of a lower de-aggregation member and, preferably, the paddles of both the upper and lower de-aggregation members are provided with a cover layer on their leading face. The cover layer is preferably from 0.1.-1 inches thick and more preferably about 0.25 inches thick. Alternately, or in addition, the cover layer is preferably removably mounted. An advantage of this design is that the cover layer of the paddles may be replaced as the cover layer wears, as opposed to replacing or repairing the entire paddle.

In accordance with another embodiment of this disclosure, which may be used by itself or in combination with any one or more other embodiments of this disclosure, a de-aggregation machine utilizes a de-aggregation member comprising a rotary mounted shaft having a plurality of paddles provided thereon. The rotary mounted shaft has a plurality of seating surfaces provided on its outer surface. The transverse cross sectional profile of the outer surface of the shaft may be polygonal. The paddles have an interior opening configured to seat on the shaft (e.g. they may be slid thereon). The seating surfaces and the interior opening of the paddles are configured such that the paddle is set at a preset angular orientation on the shaft when engaged with the shaft (i.e., the paddles may not rotate around the shaft due to the engagement of the mating surfaces). An advantage of this design is that the shaft need not be pierced such as by pins, bolts or the like or the paddle does not have to be welded to the shaft to maintain it in the correct orientation. In particular, the shaft may have a plurality of seating surfaces each of which is designed to position a paddle at a pre-determined angular orientation thereby simplifying the assembly of the machine. In order to maintain the paddles in a generally transverse configuration with respect to the axis of the shaft, a plurality of spacers may be provided between the paddles. The spacers may be of a pre-fixed length. Accordingly, when installed, the spacers will abut against the hub of the paddles thereby maintaining the paddles in a desired transverse profile with respect to the longitudinal axis of the shaft.

In accordance with another embodiment of this disclosure, which may be used by itself or in combination with one or more other embodiments of this disclosure, a machine for de-aggregating a bale of insulation includes a de-aggregation chamber comprising upper and lower interleaved paddles mounted on rotary mounted shafts and a rotary valve having an inlet which is below the rotary mounted shafts and extending substantially for the length of the lower shaft on which the paddles are provided. Accordingly, insulation which is separated by the interleaved upper and lower paddles may fall due to the influence of gravity directly into the inlet of the rotary valve thereby avoiding compaction of the de-aggregated insulation as it travels through the machine and into the rotary valve. Preferably, the rotary valve has an air inlet and a blown insulation outlet opposed to the air inlet end. The blower is provided in-line with the air inlet and so as to provide a generally linear path from the air inlet to a blown insulation outlet. A flexible hose may be attached to the blown insulation outlet. An advantage of this design is that a more uniform density of blown insulation may be obtained thereby resulting in a loose fill insulation which, once deposited in position, has a more uniform thermal conductivity.

In accordance with another embodiment of this disclosure, which may be used by itself or in combination with any one more other embodiments of this disclosure, a machine for de-aggregating a bale of insulation has a discharge zone with an outlet converter at the blown insulation outlet end. The outlet converter has an outlet end that has a different cross-sectional diameter than the inlet end. The inner surface of the outlet converter has an absence of discontinuities. For example, the outlet converter may comprise a plurality of curved and straight sections and may be continuously curved, (e.g. and may be flared). Accordingly, the outlet converter is configured to inhibit bridging of material that passes through the outlet converter.

In accordance with another embodiment of this disclosure, which may be used by itself or in combination with any one more other embodiments of this disclosure, a machine for de-aggregating a bale of insulation utilizes a rotary valve having a plurality of vanes, the vanes comprising a rigid backbone having a flexible material coated thereon (e.g. natural or synthetic rubber). Preferably, the rotary valve extends along the length of the machine and, accordingly, each vein may have a length at least the same as the length of a bale of insulation. An advantage of this design is that the rigid backbone provides mechanical stability to the vanes thereby preventing twisting of the vanes along the length of the vane. This rigidity enhances the operation of the rotary valve and improves the performance of the machine. Another advantage of this design is that the end plates of the machine (i.e. at the opposed ends of the shaft) may be anodized whereas the rest of the structure defining the surface of the rotary valve need not be anodized.

In accordance with another embodiment of this disclosure, which may be used by itself or in combination with any one or more other embodiments of this disclosure, a machine for de-aggregating a bale of insulation utilizes an exoskeleton to dimensionally stabilize the end walls of the machine. Accordingly, for example, the machine may utilize first and second opposed side walls which extend along a length of a bale of insulation when the insulation is positioned in the machine. First and second opposed load supporting end walls are provided between the spaced apart ends of the first and second sidewalls. The exoskeleton is secured and, optionally, removably secured to the end walls. Accordingly, the structural stability of the machine is provided by external members. An advantage of this design is that the opposed side walls may be made from plastic as they may not be load supporting. In addition, a further advantage is that the interior of the machine may be open and free from discontinuities caused by internal structural members, which can result in insulation building up and forming a bridge thereby inhibiting circulation of insulation within the machine.

Preferably, the exoskeleton comprises an upper frame member and a lower frame member each of which is individually secured to the end walls. Further, one or more shock absorbers may be provided between the lower frame member (which is preferably designed to engage the ground) and the machine. Accordingly, dynamic loads placed upon the machine may be absorbed by the shock absorbers and thereby the stress endured by dynamic loading of the machine may be reduced.

In accordance with another embodiment of this disclosure, which may be used by itself or with any one or more other embodiments of this disclosure, a machine for de-aggregating a bale of insulation comprises a de-aggregation chamber comprising an upper de-aggregation member and a lower de-aggregation member wherein each de-aggregation member comprises a rotary mounted shaft having a plurality of paddles provided thereon. The paddles of the upper de-aggregation member comprise first and second paddles which have differing lengths. The first and second paddles are interleaved with paddles of the lower de-aggregation member. Accordingly, it will be appreciated that the amount of interleaving of the first paddles of the upper de-aggregation member with the paddles of the lower de-aggregation member differs according to the amount of interleaving of the second paddles of the upper de-aggregation member with the lower de-aggregation member. The primary function of the first or longer paddles of the upper de-aggregation member is to remove sections of insulation from the bale. A secondary function of the longer paddles is to de-aggregate the insulation (e.g. to stretch and separate the fibers). In contrast, the primary function of the shorter paddles of the upper de-aggregation member is to de-aggregate the insulation. A secondary function of the shorter paddles may be to remove insulation from the bale. An advantage of this design is that the de-aggregation members provide enhanced de-aggregation of the insulation.

In accordance with another embodiment of this disclosure, which may be used by itself or in combination with any one or more of the embodiments of this disclosure, a machine for de-aggregating a bale of insulation comprises a de-aggregation chamber having an upper de-aggregation member and a lower de-aggregation member. The upper de-aggregation member has a plurality of paddles provided. The paddles of the upper de-aggregation member face in differing opposed directions. An advantage of this design is that the upper paddles provide a sub-circulation of insulation in the machine. For example, if the paddles were all facing a single direction, then the paddles would continually move insulation towards one end of the machine. However, by providing paddles facing opposed ends of the machine, then some paddles will direct the insulation towards one end of the machine whereas other paddles would direct the insulation in the opposite direction. Accordingly, this improves the circulation of insulation within the machine and, at the same time, assists in maintaining a generally even amount of insulation distributed along the length of the machine and, accordingly, may enhance the de-aggregation of the insulation.

In accordance with another embodiment of this disclosure, which may be used by itself or in combination with any one or more other embodiments of this disclosure, a machine for de-aggregating a bale of insulation comprises a de-aggregation chamber having an upper de-aggregation member and a lower de-aggregation member, each of which comprises a rotary mounted shaft. In addition, a rotary valve is provided in a discharge zone. The rotary mounted valve and the upper and lower de-aggregation members are driven by a motor. In accordance with this embodiment, the drive member for at least one of the upper de-aggregation member, the lower de-aggregation member and the rotary valve is provided on a different side to the drive member for the other two. This provides a more uniform load distribution. For example, if all drive members were provided on a single side, then all of the torque produced by the drive members would be located on one side of the rotary shafts. In contrast, by providing one of the drive members on an opposed end of a shaft, the torque produced by the drive members is more evenly distributed on both sides of the shaft thereby reducing stresses which are applied to the machine.

DESCRIPTION OF THE DRAWINGS

These and other advantages of the machine will be more fully and completely understood in association with the following descriptions of the preferred embodiments wherein:

FIG. 16 is a perspective view of an embodiment of the upper and lower de-aggregation members;

FIG. 17 is an exploded view of an embodiment of the upper de-aggregation member;

FIG. 18*b* is a perspective view of FIG. 18*a;*

A DETAILED DESCRIPTION

Figure 1:
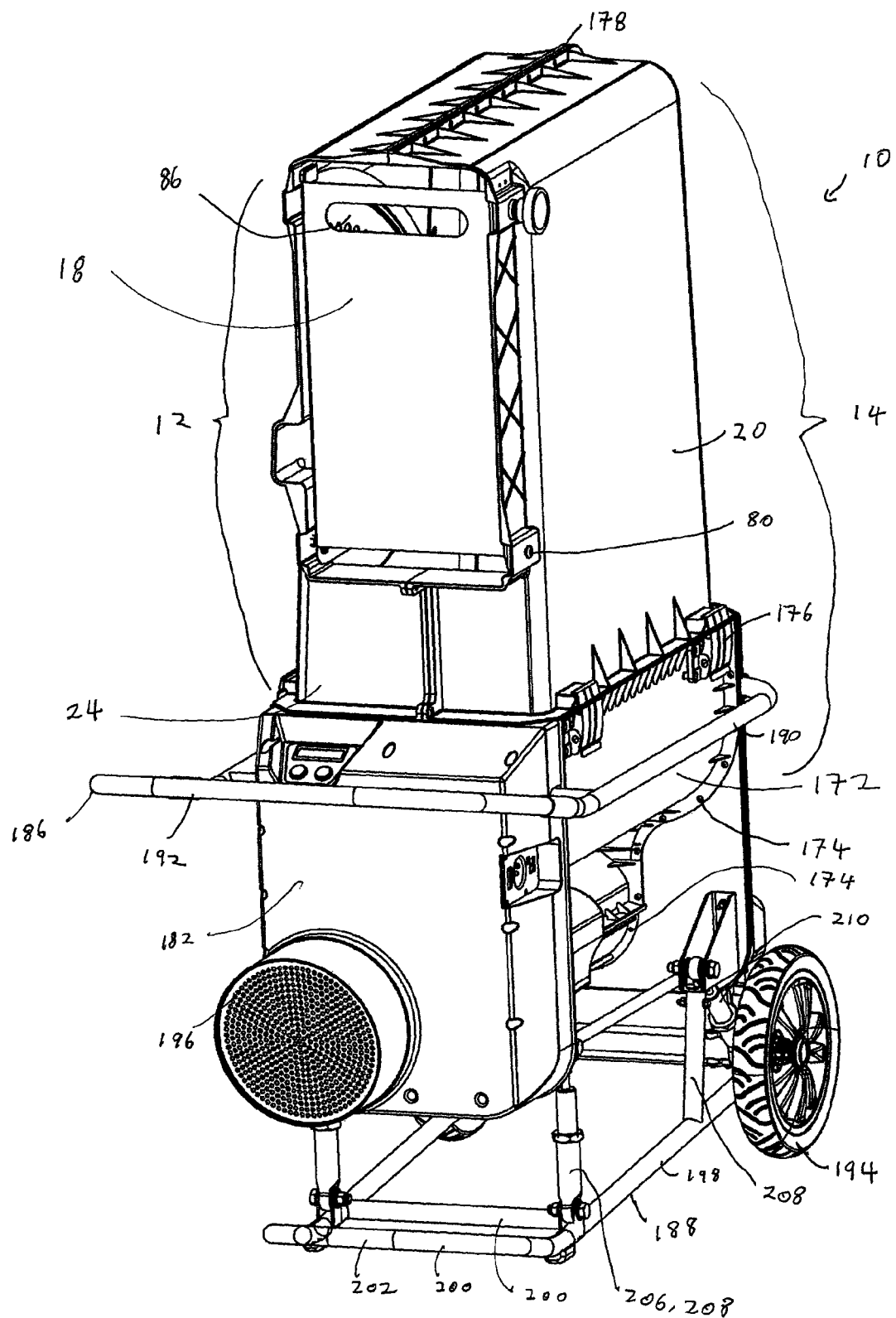
FIG. 1 is a perspective view from the front end and to one side of a machine according to the instant disclosure.
Figure 2:
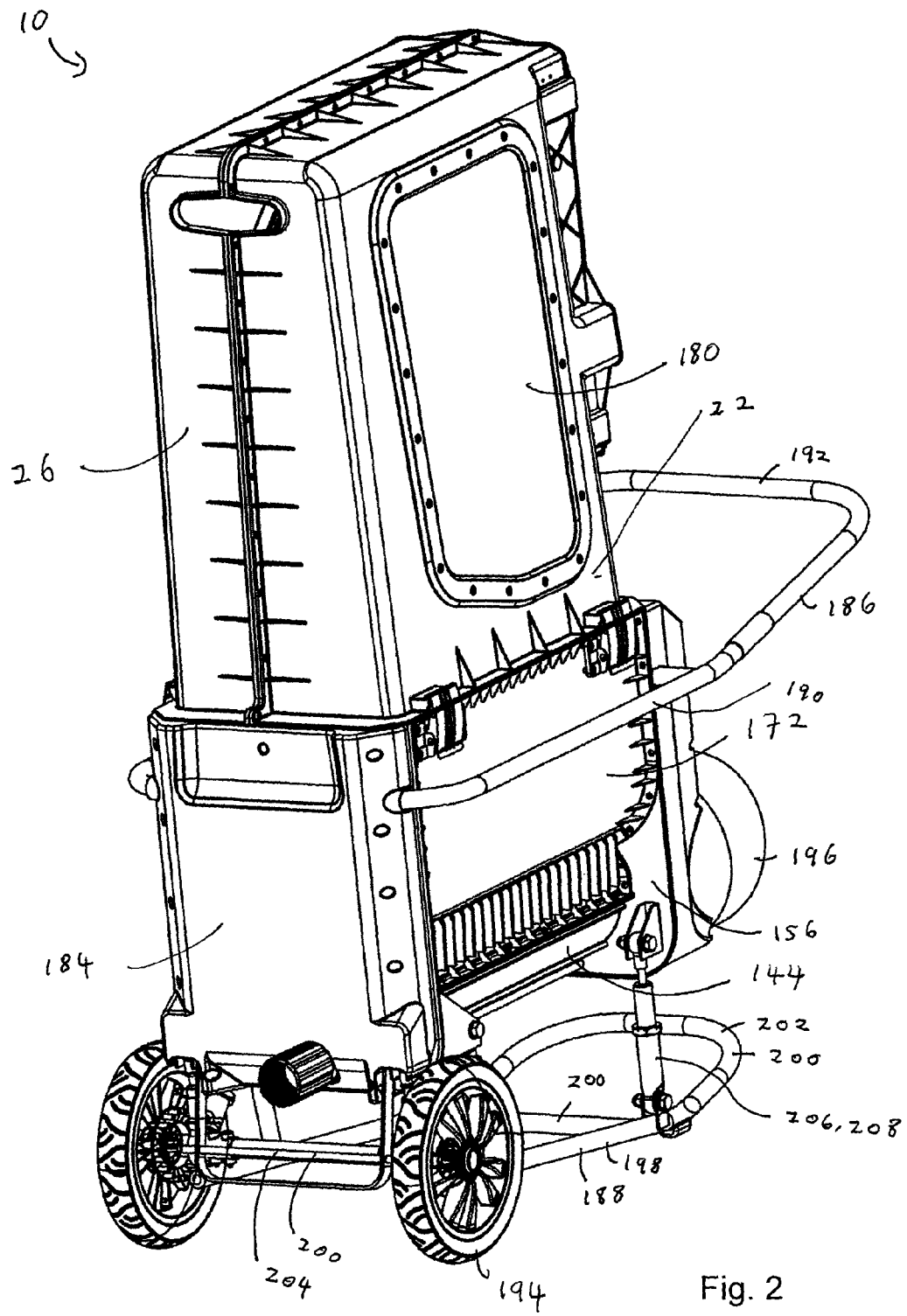
FIG. 2 is a perspective view from the rear end and the other side to that shown in FIG. 1 of the machine of FIG. 1.

Various apparatuses or methods will be described below to provide an example of each claimed invention. No example described below limits any claimed invention and any claimed invention may cover processes or apparatuses that are not described below. The claimed inventions are not limited to apparatus or processes having all of the features of any one apparatus or process described below, or to features common to multiple or all of the apparatuses described below. It is possible that an apparatus or process described below is not an embodiment of any claimed invention.

As exemplified in FIGS. 1-5, de-aggregation machine 10 may comprise a de-aggregation chamber 14 (comprising an entrance zone 12 and a de-aggregation zone 13), a discharge zone 16 and a feeder 18 provided in the entrance zone 12. The machine comprises a pair of first and second opposed side walls 20, 22, and a pair of opposed end walls 24, 26. As exemplified in FIGS. 3 and 5, feeder 18 is rotatable to an open position wherein a bale of insulation 28 may be positioned thereon. As shown in FIGS. 6-13, machine 10 comprises an upper de-aggregation member 30 and a lower de-aggregation member 32 in de-aggregation zone 13. In addition, rotary valve 34 may be provided in discharge zone 16.

Accordingly, when bale 28 is placed in entrance zone 12, it will pass downwardly to be engaged by upper de-aggregation member 30. Insulation which is removed from bale 28 by upper de-aggregation member 30 will pass downwardly to lower de-aggregation member 32 where it will be further de-aggregated. De-aggregated insulation will pass downwardly from lower de-aggregation member 32 into valve 34.

In some embodiments, of machine 10, machine 10 may contain any number of de-aggregation members. However, in accordance with a preferred embodiment, machine 10 utilizes upper and lower interleaved de-aggregation members 30, 32. More preferably, only two interleaved de-aggregation members are used.

Figure 10:
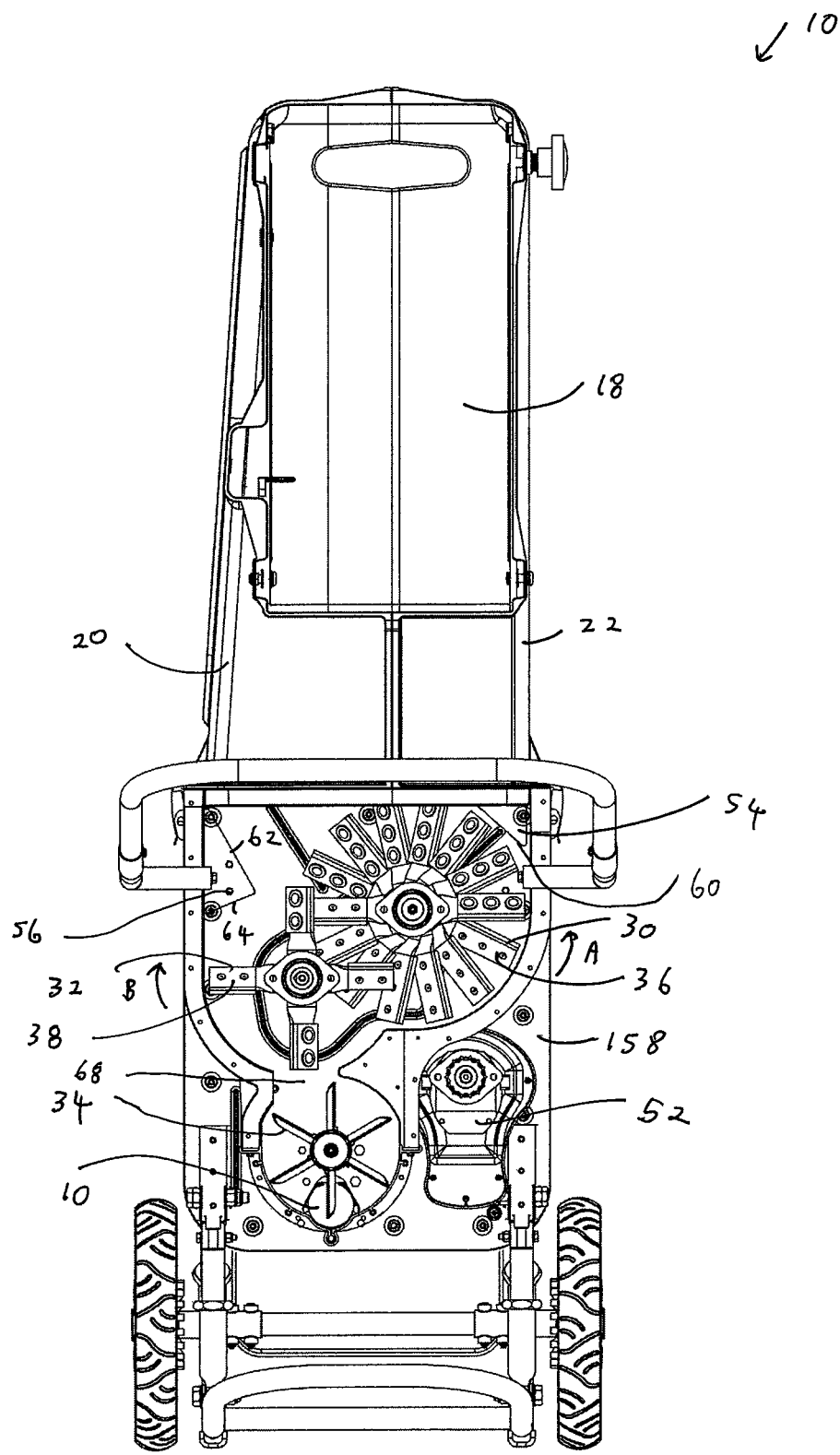
FIG. 10 is a cut away end view of the machine of FIG. 1.
Figure 11:
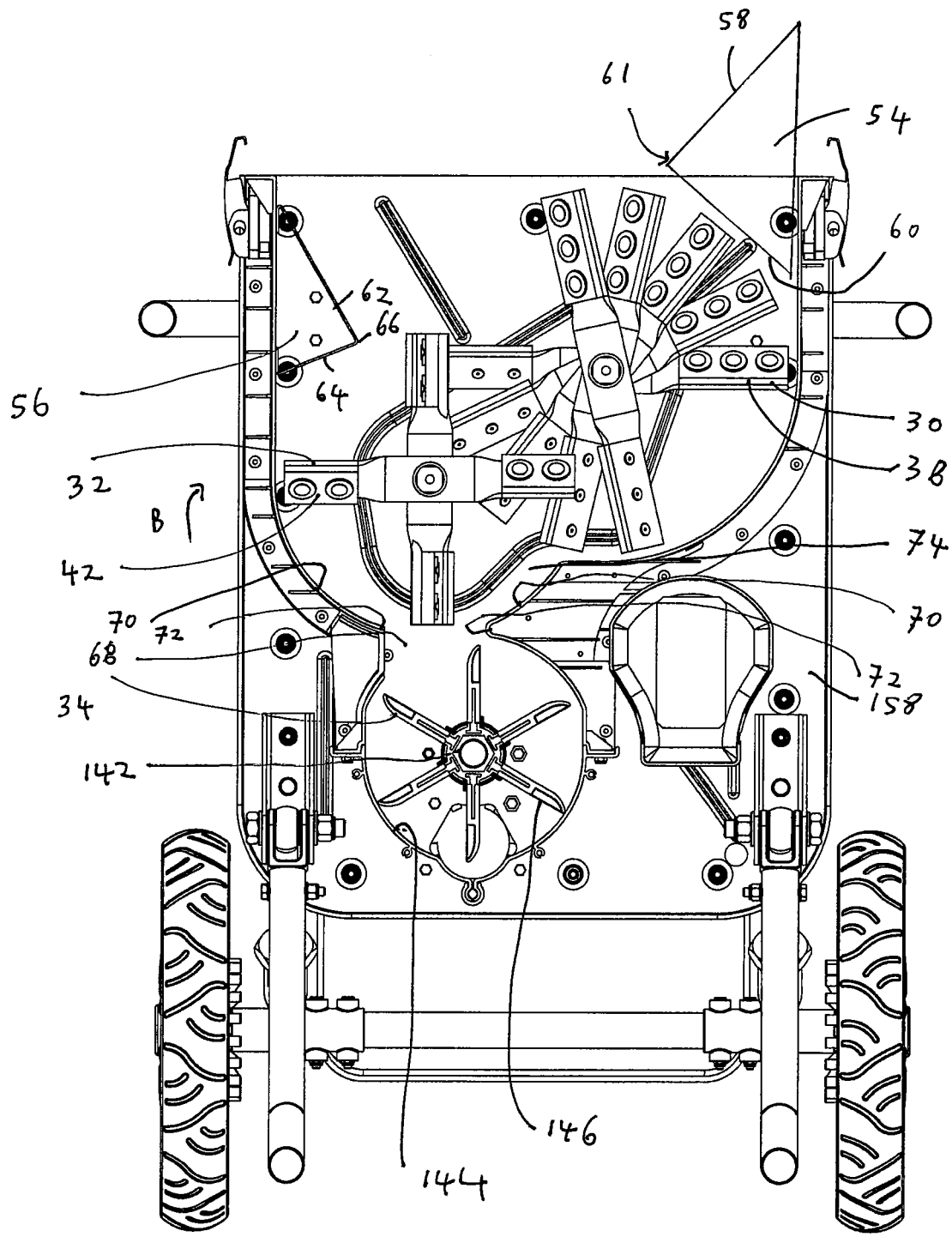
FIG. 11 is a partially cut away end view of the machine of FIG. 1 showing an alternate configuration of the paddles of the upper rotor.
Figure 12:
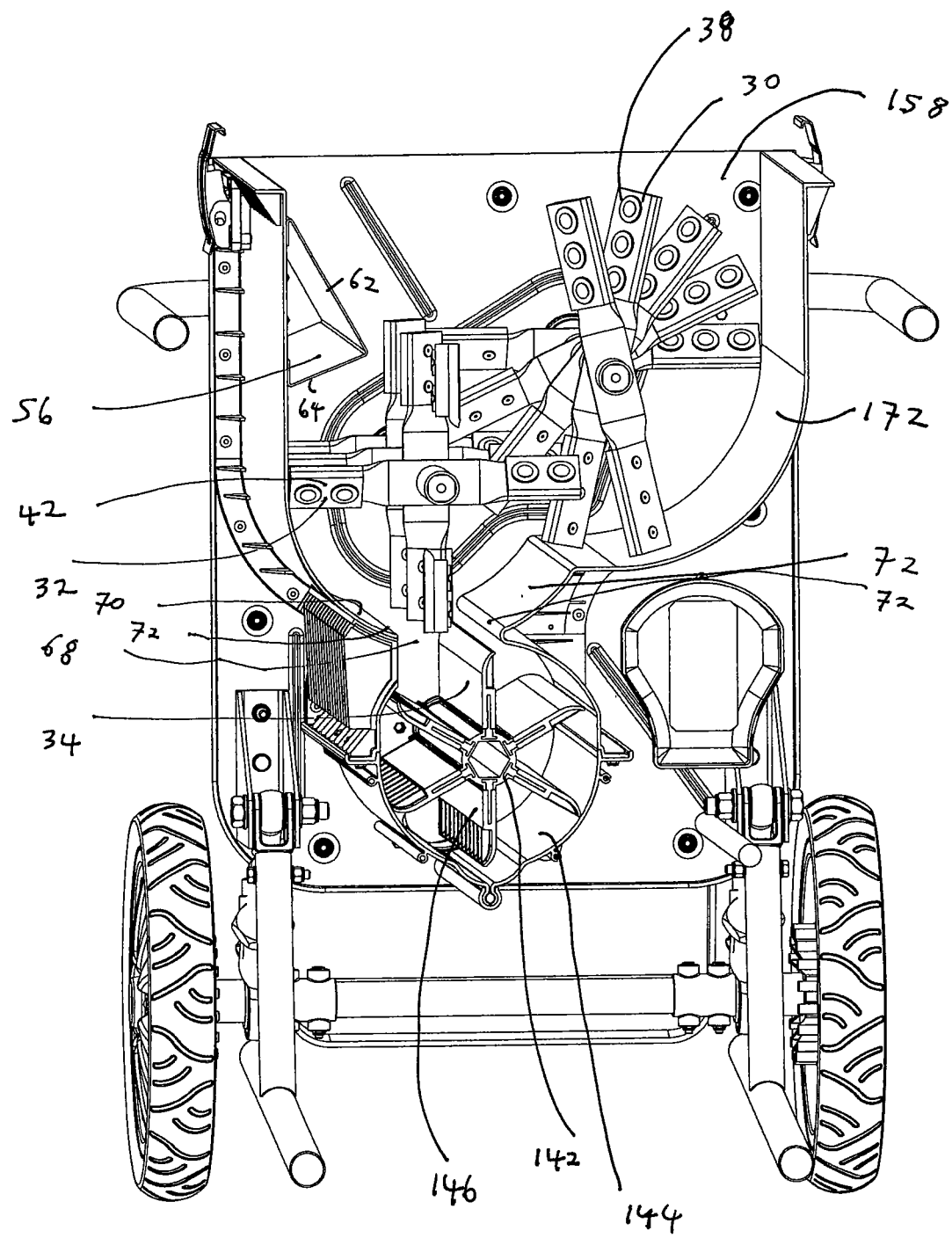
FIG. 12 is a perspective view of the machine shown in FIG. 11.

As exemplified in FIGS. 10-12, in a preferred embodiment, upper de-aggregation member 30 is positioned so as to be the only de-aggregation member that engages bale 28.

As also exemplified in FIGS. 10-12, in a preferred embodiment, the rotary shafts of the aggregation members 30 and 32 are preferably vertically and laterally off set from each other. For example, upper de-aggregation member 30 may be positioned offset from the center of machine 10 (i.e. closer towards side 22 than side 20) and lower de-aggregation member 32 may also preferably positioned off-center (e.g. closer to side 20 then side 22).

Structure of the De-Aggregation Members

Preferably, each de-aggregation member 30, 32 comprises a rotary mounted shaft and a plurality of paddles provided thereon. Preferably, the paddles are positioned in a staggered angular orientation with respect to each other around the shaft. Accordingly, upper de-aggregation member 30 may comprise a rotary mounted shaft 36 having a plurality of paddles 38 provided thereon. Similarly, lower de-aggregation member 32 may comprise a rotary mounted shaft 40 having a plurality of paddles 38 thereon.

Figure 20:
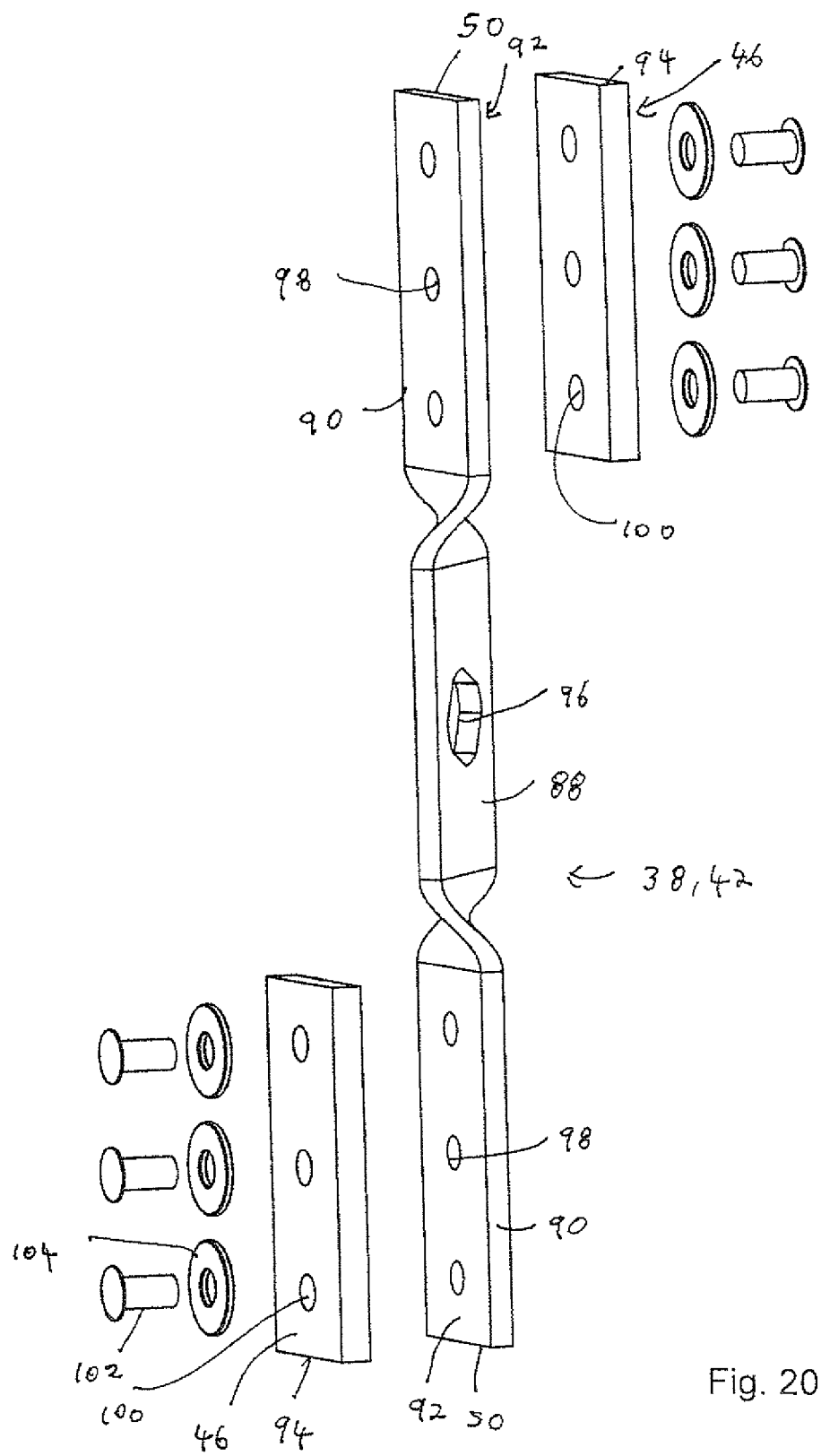
FIG. 20 is an exploded view of a paddle.

Paddles 38, 42 may be of any particular design known in the art. Each paddle preferably comprises a blade portion 90 mounted on a shaft. Preferably, in some embodiments, paddles 38, 42 are designed to pass through bale 28 so as to remove or peel sections therefrom as opposed to cutting through the bale. Accordingly, paddles 38, 42 need not have a sharp edge. Instead, as shown in FIG. 20, the edges may be blunt.

Horizontal Positioning of the Bale

One of both of the upper de-aggregation member 30 and the entrance zone 12 may be configured to maintain bale 28 generally vertically disposed in entrance zone 12 as the paddles remove sections from bale 28. Preferably, both are so configured. An advantage of this design is that the bottom of bale 28 will be continually exposed to upper de-aggregation member 30 as the bale is de-aggregated thereby resulting in generally even amounts of insulation being continuously removed from bale 28 and more uniform processing of the removed insulation.

Figure 8:
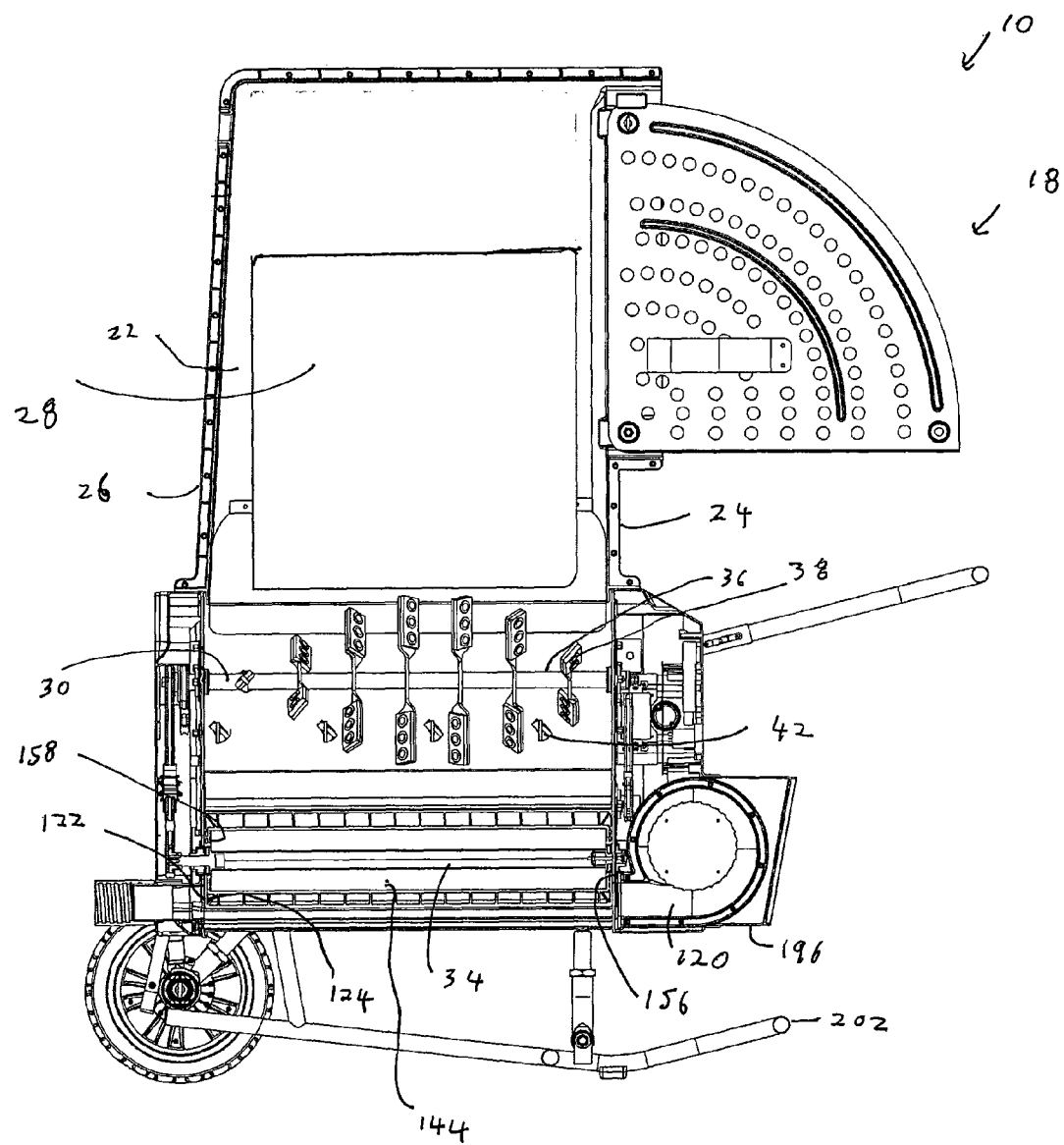
FIG. 8 is a vertical section through the machine of FIG. 1 with a bale of insulation positioned in the entrance zone and the feed door open.

Preferably, bale 28 is initially engaged only by paddles 38 of upper de-aggregation member 30. Accordingly, as shown in FIG. 8, when bale 28 is positioned in entrance zone 12, it will pass downwardly and be engaged by paddles 38.

The paddles 38 of the upper de-aggregation member 30 are preferable configured to have an equal engagement with bale 28 on each side of the center line of the length of the bale 28. It will be appreciated that the desired number of paddles 38 that fully engage a bale 28 at any one time will be determined by the angular staggering of the paddles and the number of paddles that are provided.

A standard bale of insulation, when decompressed, is somewhat less than 15" wide by 30" long. However, it is noted that bales of other dimensions may be made. For a typical bale, it is preferred that the paddles 38 of the upper de-aggregation member 30 be from 0.75" to 3" wide, and preferably from 1.25" to 2" wide. Accordingly, it is preferred that at most, 2 paddles are fully engaged in the bale at any one time (i.e., they extend vertically upwardly). However, if the length of the bale varies, then the number of paddles may be linearly adjusted. Accordingly, it is preferred, for example, that up to 20% of the paddles 38 fully engage the bale at any one time.

Figure 18A:
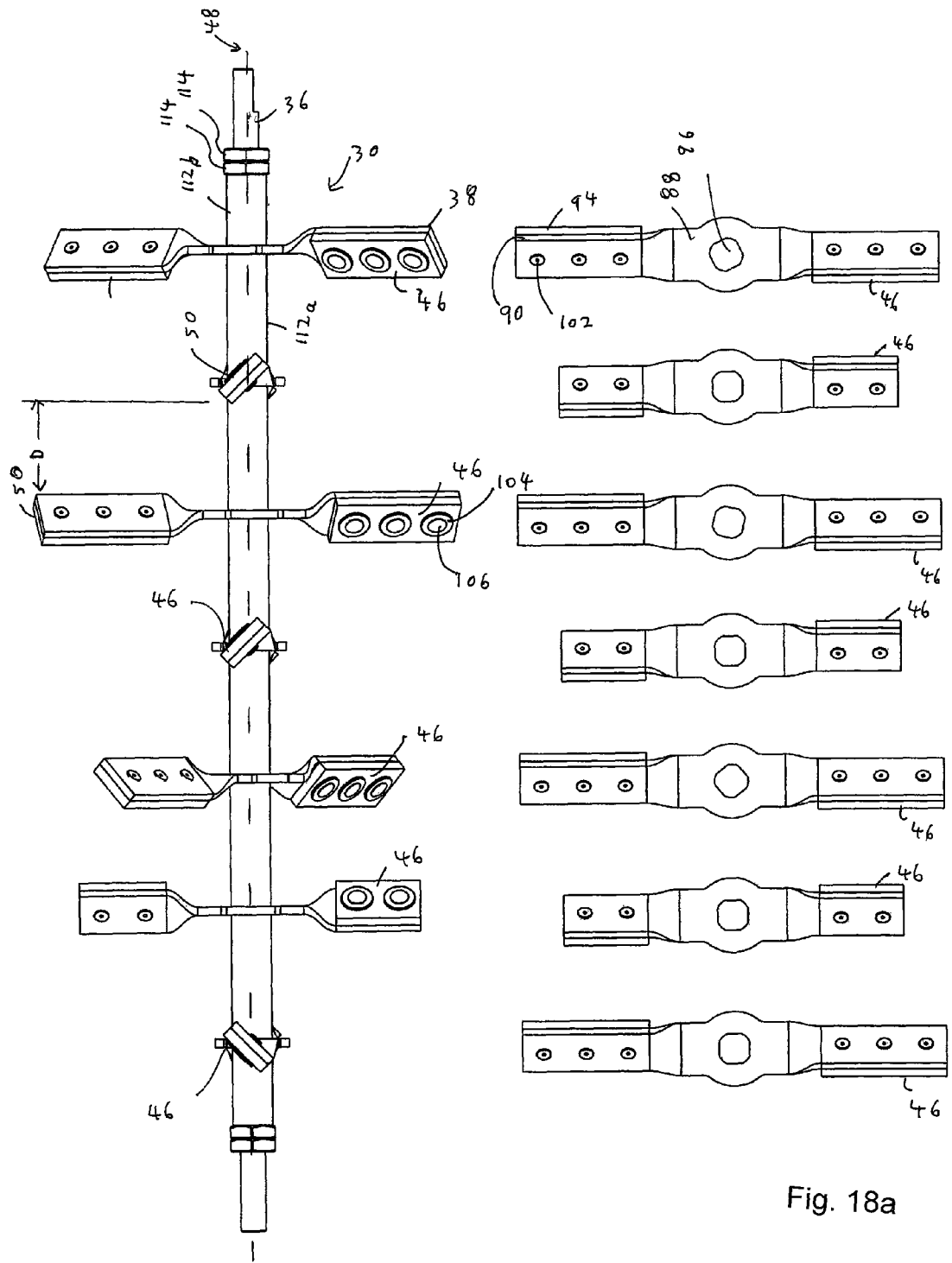
FIG. 18*a* is a top plan view of the upper de-aggregation member showing the leading face of the paddles facing in alternating directions together with a view of the paddles in the alternating directions removed from the shaft.

As exemplified in FIG. 18, paddles 38 may have an outer radial extent 50. The outer radial extent of adjacent paddles 38 may be spaced apart a distance D that is from 8 to 30, more preferable 12 to 20, and most preferably, about 20% of the width W of bale 28.

Figure 9:
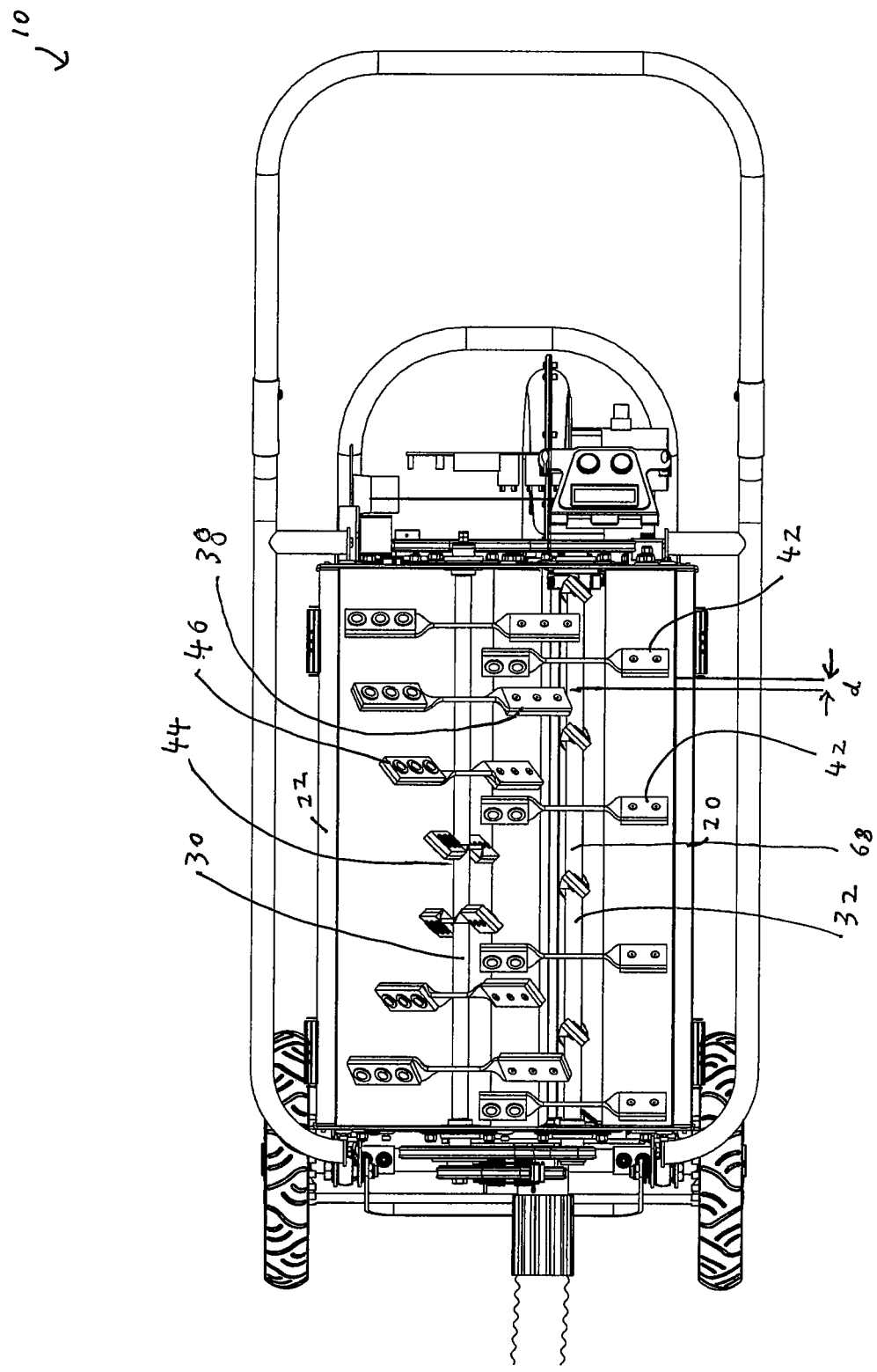
FIG. 9 is a horizontal sectional view through the entrance zone of the machine of FIG. 1.

For example, as exemplified, upper shaft 36 has a center 44 (see FIG. 9). In a preferred embodiment, paddles 38 are positioned so as to engage only a portion of bale 28 and, in addition, such that only some of paddles 38 engage bale 28 at any particular time. Accordingly, paddles 38 may be angularly staggered around shaft 36 such that only a single paddle 38 on each side of center 44 of shaft 36, or a single paddle 38 that traverses center 44 as shaft 36 rotates, extends vertically upwardly at any one time. Accordingly, the paddles 38 which are adjacent to the paddle 38 that extends vertically may engage bale 28 and may be partially embedded therein so as to support bale 28 when the rotor position there between extends vertically. It will be appreciated that, if thinner paddles are used, then 3 or 4 paddles may fully engage the bale at any one time.

In a preferred embodiment, the upper de-aggregation member may have an odd number of paddles 38 and the lower de-aggregation member may have an even number of paddles 38. Accordingly, each paddle of an upper de-aggregation member may be interleaved (e.g. pass between) the paddles of the lower de-aggregation member. The upper de-aggregation member may comprise from 5 to 9 paddles 38 and the lower de-aggregation member may comprise from 6-10 paddles 38.

Preferably, the lower de-aggregation member 32 is interleaved only with the upper de-aggregation member 30. More preferably, only two de-aggregation members 30, 32 are provided.

Configuration of the De-Aggregation Members

Figure 14:
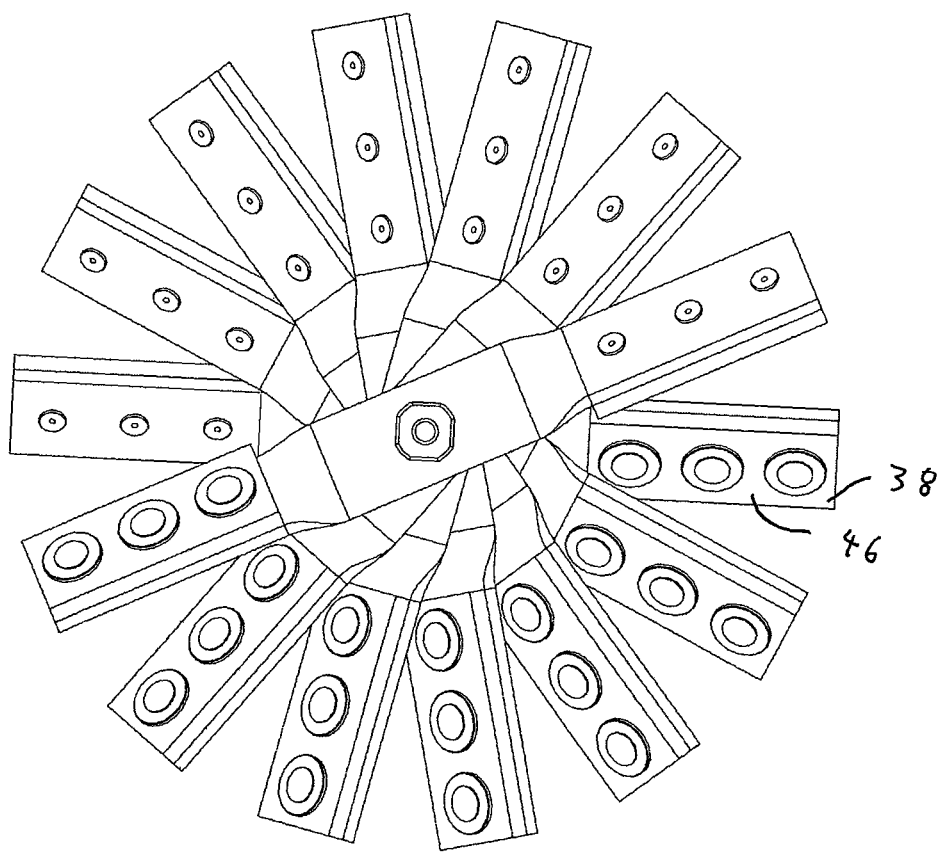
FIG. 14 is an end view of an embodiment of the upper de-aggregation member showing a possible angular staggering of the paddles of the upper de-aggregation member.
Figure 15:
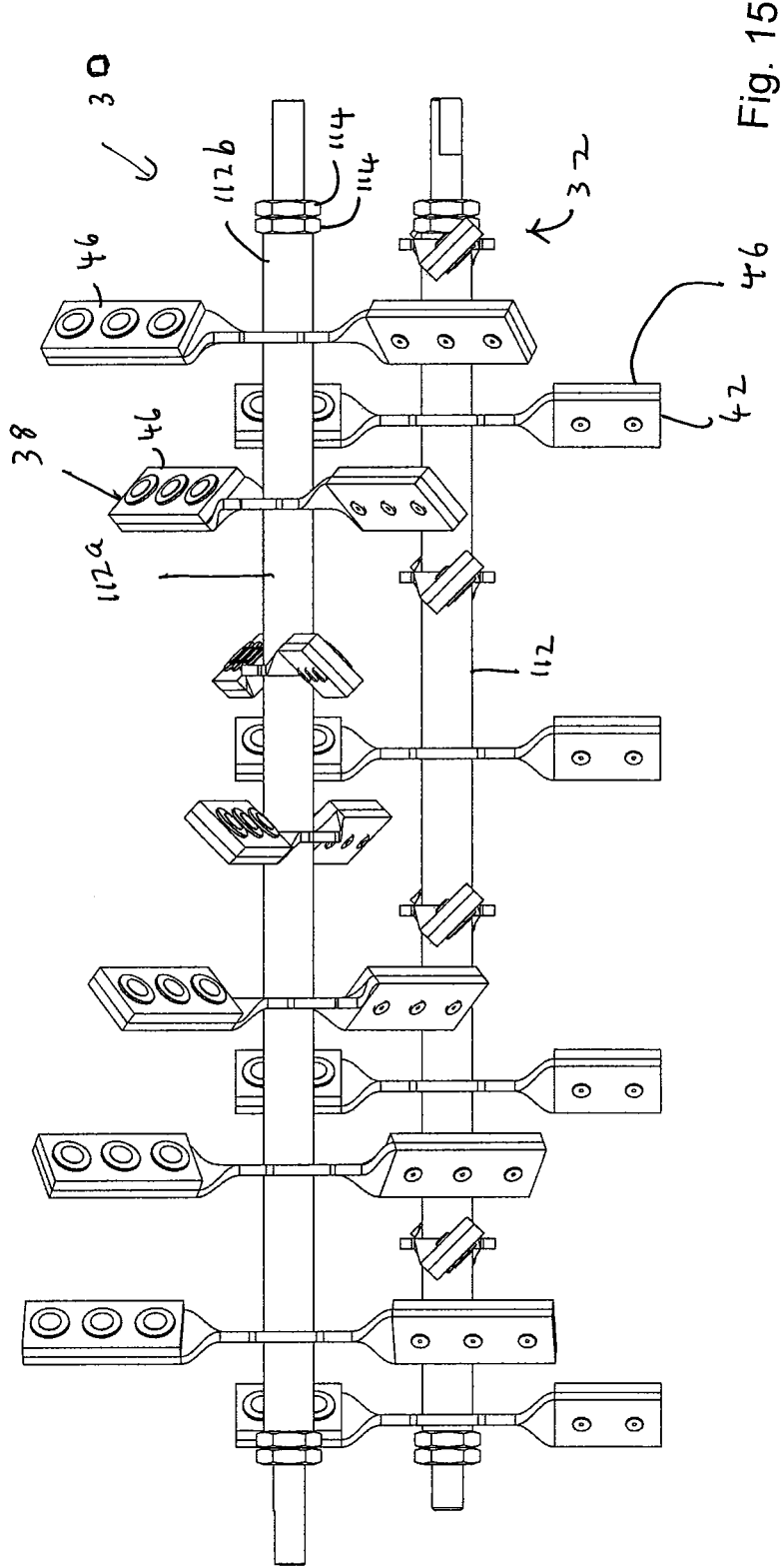
FIG. 15 is a top plan view of an embodiment of the upper and lower de-aggregation members.

All of the paddles 38, 42 or blade portions 90 of the upper and/or lower de-aggregation members may all face in the same direction as exemplified in FIGS. 14-16. As shown therein, the leading face 46 of each blade portions 90 all face towards one end of machine 10 (e.g. end wall 24). In an alternate embodiment, as exemplified in FIGS. 18a and 18b, the paddles may face alternating directions. For example, leading face 46 of some blade portions 90 may face towards end wall 24 and the leading edge 46 of other blade portions 90 may face towards end wall 26. More preferably, facing direction of the leading edge of 46 of blade portions 90 are alternated along the shaft.

An advantage of having the leading faces 46 face in different directions is that the blade portions 90 will provide a different longitudinal movement (i.e. in the direction of the longitudinal axis 48 of shaft 36). Accordingly, for example, some paddles will direct insulation towards end wall 24 and other paddles will direct insulation towards end wall 26. Accordingly, the alternating staggering of the direction of leading face 46 will cause insulation to pass longitudinally in alternate directions as the insulation passes downwardly through the de-aggregation chamber 14. This alternating motion will provide some sub-circulation of insulation in the de-aggregation zone 13 and assist in improving the uniformity of the density of the de-aggregated insulation. Further, it will assist in maintaining a more even distribution of insulation along the length of shafts 36, 40.

Alternately, or in addition, all of the blade portions 90 on a shaft 36, 40 may be the same length or have alternating lengths. Preferably, as exemplified in FIGS. 18a and 18b, blade portions 90 of upper de-aggregation member 30 have differing lengths. More preferably, shorter and longer blade portions 90 alternate. Accordingly, for example, all of the shorter blade portions 90 may have a leading face 46 which faces in one direction and all of the longer blade portions 90 may have a leading face 46 which faces in the alternate direction. If the blade portions of one of the de-aggregation members vary in length then, preferably, the shorter blade portions 90 have a length that is from 60-90%, and preferably about 80%, the length of the longer blade portions 90.

Some embodiments, paddles 38, 42 may be evenly angularly staggered around shaft 36, 40. In other embodiments, the paddles may be angularly staggered around the shaft but at irregular positions. A particularly preferred configuration for the upper de-aggregation member 30 is set out in the following table.

| Blade portion | Length of blade portion | Angular position | End wall |
|---|---|---|---|
| 1 | 10" | 0° | 24 |
| 2 | 8" | −65° ccw | 26 |
| 3 | 10" | +39° cw | 24 |
| 4 | 8" | −65° ccw | 26 |
| 5 | 10" | +77° cw | 24 |
| 6 | 8" | −154° ccw | 26 |
| 7 | 10" | +116° cw | 24 | cw = clockwise
ccw = counter clockwise
angle of offset + or −15°

Preferably, blade portions 90 of lower de-aggregation member 32 are 8" long and are staggered 90° sequentially along the shaft.

Using this preferred embodiment, the primary function of the longer blade portions 90 (i.e. the 10" paddles) is to peel or remove insulation from bale 28. The secondary function of the longer blade portions 90 is to condition material in the area in which the paddles are interleaved with the paddles of the lower de-aggregation member. In other words, the insulation in the interleaved area is de-aggregated or pulled apart by the counter rotation of the blade portions 90 of the upper and lower de-aggregation members. In contrast, the primary function or the shorter (e.g. 8") blade portions 90 of the upper de-aggregation member 30 is to condition insulation in the interleaved area and the secondary function of these blade portions 90 may be to remove insulation from bale 28.

As shown in FIG. 9, the edges of adjacent interleaved blade portions 90 of paddles 38, 42 of the upper and lower de-aggregation members are spaced apart by a distance d. The distance may be uniform or may vary between different adjacent paddles 38, 42. The distance may vary from 0.05" to 1", more preferably from 0.1" to 0.5" and, most preferably from 0.15" to 0.25". This distance, which may be used optionally with the coating layer applied to the leading edge of the blade portions 90 of paddles 38, 42 assists in de-aggregating the fibers.

It will be appreciated that the blade portions 90 of upper and lower paddles 38, 42 need not be completely interleaved and are preferably not completely interleaved. Further, if the blade portions 90 of the upper paddles have differing lengths, and the blade portions 90 of the paddles of the lower de-aggregation member have a length approximate the length of the shorter blade portions 90 of the paddles of the upper de-aggregation member, then the longer blade portions 90 of the paddles 38 cannot be fully interleaved. Preferably, the blade portions 90 of the paddles are interleaved from 20-60% the length of the blade portions 90, more preferably from 20-50% and, most preferably from 30-40%.

In addition, if blade portions 90 of paddles 38 of the upper de-aggregation member 38 differ in length, then the longer blade portions 90 of paddles preferably have an overlap with the blade portions 90 of paddles 42 of the lower de-aggregation member that is from 30-50% and, more preferably, about 40% of the length of the blade portions 90 of the paddles of the lower de-aggregation member. Similarly, the shorter blade portions 90 of the paddles 38 of the upper de-aggregation member preferably have an overlap with blade portions 90 of the paddles 42 of the lower de-aggregation member that is from 20-40% and, more preferably, about 30% of the length of the blade portions 90 of the paddles 42 of the lower de-aggregation member. Accordingly, it will be appreciated that while the blade portions 90 of the paddles 38, 42 are preferably interleaved, and are preferably relatively closely spaced together, that only about half or a third of the length of the blade portions 90 of the paddles may in fact be interleaved and preferably the longer blade portions of the upper de-aggregation member 38 overlap the blade portions of the lower de-aggregation member by a greater percentage or a greater absolute length of overlap then the shorter blade portions of the upper de-aggregation member 38 overlap the blade portions of the lower de-aggregation member. The zone where the blade portions 90 of the paddles are interleaved is the area in which the paddles co-operate to de-aggregate and stretch the fibers.

Rate of Rotation

It will be appreciated that the upper de-aggregation member 30 may rotate at a different rate than the lower de-aggregation member 32 and that both may rotate optionally at a different rate to rotary valve 34. For example, the upper de-aggregation member may rotate a slower rate than the lower de-aggregation member. For example, upper de-aggregation member may rotate at a rate that is 20-50% and preferably 30-40%, slower than the rate of rotation of lower de-aggregation member 32. Rotary valve 34 may rotate at a rate that is from 50-140%, more preferably 65-115%, and most preferably from 65-85% of the rate of rotation of the upper de-aggregation member 30.

For example, motor 52 may rotate at a speed from 400-700, preferably from 600-500, and most preferably 525-575 rpm. Lower de-aggregation member 32 may be driven by motor 52 (e.g. a drive chain 214 may be utilized to drivingly connect motor 52 and lower de-aggregation member 32). The drive mechanism may utilize a speed reduction of, e.g., 14:40. The lower de-aggregation member may be drivingly connected to upper de-aggregation member 30 by a drive chain 220. This second drive mechanism may utilize a gear reduction of, e.g. 14:40. The rotary valve may be driven by upper de-aggregation member 30. Accordingly, a further drive chain 228 may be utilized to drivingly connect upper de-aggregation member 30 and rotary valve 34. The gearing which is utilized may vary from 10:40-28-14, preferably 12:14-22:14, and most preferably 18:14. Accordingly, it will be appreciated that the lower de-aggregation member may rotate, e.g., at about 190 rpm and the upper de-aggregation member may rotate, e.g., at about 65 rpm. Accordingly, the upper de-aggregation member may in fact operate at a relatively low rpm (e.g. 85-50 rpm).

Guide Members

In accordance with another embodiment, upper guide member 54 and/or lower guide member 56 may be provided to assist in creating additional circulation of insulation in the de-aggregation chamber 14 to enhance the de-aggregation of the insulation. This feature may be used together with the staggering the leading edge of paddles 38 to face in opposite directions, or without that feature. Staggering the leading face 46 of paddles 38 provides a sub-circulation of insulation within de-aggregation chamber 14 that is longitudinal (i.e. in the direction of axis 48 of shaft 36). In contrast, the guide members are positioned on one or both of opposed side walls 20, 22 so as to create additional recirculation of insulation in de-aggregation chamber 14. Accordingly, different methods may be used to create a sub-circulation of insulation. Sub-circulation is used to refer to a secondary circulation of insulation other than the primary circulation of insulation downwardly through machine 10.

Referring to FIGS. 10-12, upper and lower guide members 54, 56 are shown. Upper guide member 54 has an upper surface that extends inwardly and downwardly to a maximum inward position. The upper guide member 54 may have an upper surface 58 that is accordingly angled downwardly from one of the side walls 20, 22 to a position that is above the top of paddles 38 of upper de-aggregation member 30. The upper guide member 54 preferably extends inwardly an amount so as to engage a portion of a typical bale 28 which has been placed in entrance zone 12. It will be appreciated that, when removed from its packaging, bale 28 will expand. Typically bales of insulation are packaged so as to expand slightly in the length and width direction and to expand primarily in the height or vertical direction. For example, the length and width of a bale may expand by about 10% when released from the packaging. However, the height of the bale may expand by 200%. The maximum inward position of upper guide member 54 is preferably selected so that it will engage at least a portion of a typical bale 28.

Guide member 54 may have a lower surface 60 which is configured to inhibit insulation engaged by the upper de-aggregation member 30 from passing upwardly into entrance zone 12. Accordingly, for example, lower surface 60 may be solid and may be angled upwardly. Accordingly, as exemplified in FIG. 10, if upper de-aggregation member rotates counterclockwise as indicated by arrow A, insulation will be directed away from sidewall 22 towards sidewall 20. An advantage of this design is that partially de-aggregated insulation will not be fed upwardly into entrance zone 12. If insulation is fed upwardly into entrance zone 12, then this insulation, together with bale 28, may result in insulation bridging between sidewall 22 and bale 28 thereby inhibiting the downward movement of bale 28 under gravity.

Lower guide member 56 is provided with a lower surface 60 which is configured to direct insulation away from sidewall 22 towards the interior of de-aggregation chamber 14. As exemplified, lower surface 64 is angled upwardly and has a maximum inward extent 66 which is at a height of about the top of paddle 42 when extending vertically upwardly as exemplified. Accordingly, as exemplified in FIG. 10, if lower de-aggregation member 32 rotates clockwise as indicated by arrow B, insulation will be directed away from sidewall 20 towards sidewall 22. Optionally, lower guide member 56 may have an upper surface 62 which is provided to cover the top of lower guide member 56 to prevent the build-up or bridging of material in the de-aggregation chamber 14. In addition, upper surface 62 may assist in guiding insulation inwardly towards the de-aggregation members.

Accordingly, as can be seen, it is preferred that de-aggregation member 30 rotates to direct insulation away from upper guide member 54 (e.g. in the countercurrent direction as indicated by arrow A in FIG. 10). Alternately, or in addition, it is preferred that the lower de-aggregation member 32 rotates to direct insulation away from lower guide member 56 (e.g. clockwise as shown by arrow B in FIG. 10).

Configuration of the De-Aggregation Chamber

The entrance zone 12 is preferably configured to inhibit rotation of bale 28 as upper de-aggregation member 30 engages bale 28. For example the horizontal cross-sectional area of entrance zone 12 is preferably only slightly larger than horizontal cross-sectional area of compressed bale 28. For example, the length of the entrance zone is preferably at least slightly larger than the length of bale 28. Further, the width of the entrance zone is larger than the width of bale 28 and, preferably less than 1.75 times the width of bale 28. More preferably, the width of the entrance zone is 1:1.2 to 1:1.4 times the width of bale 28. More preferably, the horizontal cross-sectional area of entrance zone 12 is larger than and proximate that of a horizontal cross-sectional area of the bale 28. Accordingly, if bale 28 is positioned with its bottom surface horizontally disposed in machine 10, then, as upper de-aggregation members 30 engages bale 28, bale 28 will remain essentially vertical and the lower surface will remain essentially horizontal. Accordingly, as insulation is removed from the bale, paddles 38 of upper de-aggregation member 30 will be able to continue to engage the lower surface of the bale in the same manner.

In addition, it is preferred that de-aggregation zone 13, which contains upper and lower de-aggregation members 30 and 32, has a horizontal cross-sectional area which is proximate the horizontal cross-sectional area of entrance zone 12. Accordingly, as insulation passes downwardly through de-aggregation chamber 14, the horizontal cross-section area may remain generally constant. This will inhibit compaction of de-aggregated insulation.

Choke

Preferably, as exemplified in FIGS. 11 and 12, the horizontal cross-sectional area of de-aggregation chamber 14 decreases only adjacent inlet 68 to rotary valve 34 where a choke is provided.

Figure 13:
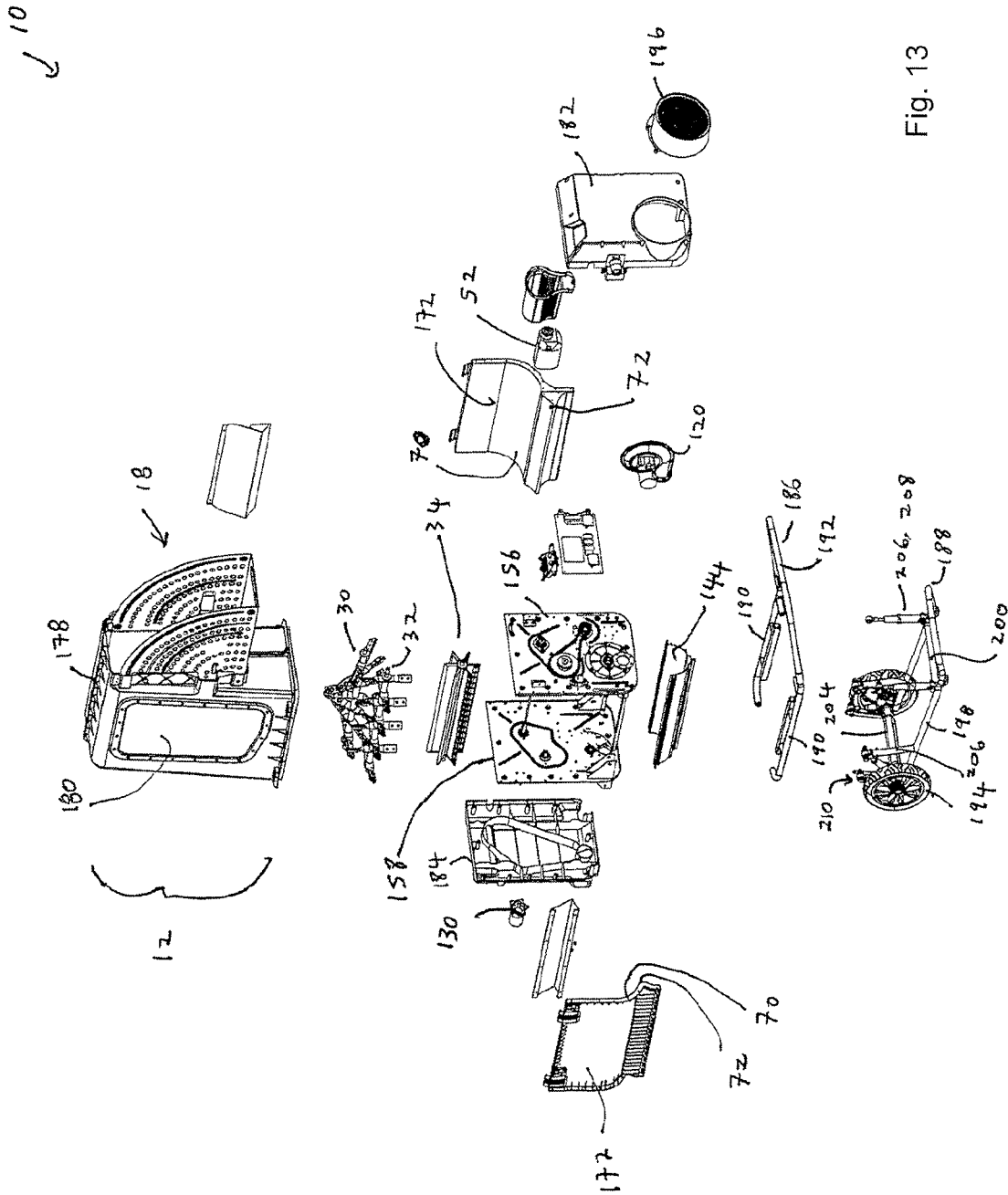
FIG. 13 is an exploded view of the machine of FIG. 1.

Referring to FIGS. 11-13, the lower surface 60 of de-aggregation chamber 14 narrows below lower de-aggregation member 32 towards inlet 68. Preferably, as shown, lower surface 70 is curved. Accordingly, as lower de-aggregation member 32 rotates, preferably in the clockwise direction as indicated by Arrow B, insulation will travel downwardly and inwardly through flow path 70 towards inlet 68. Preferably, one and, more preferably, each side of inlet 68 is provided with a choke 72. Choke 72 may be a fixed choke and exemplified or may be a variable choke. Choke 72 is configured such that some of the insulation which travels towards inlet 68 is re-circulated with paddles 42 and travels clockwise past inlet 68 and upwardly towards lower guide member 56. An advantage of choke 72 is that some of the insulation which reaches inlet 68 will be re-circulated within de-aggregation zone 13 and will be subjected to additional de-aggregation by upper and lower de-aggregation members 30 and 32.

Inlet to the Rotary Valve

As shown in FIG. 13, lower surfaces 70 and choke 72 preferably extend longitudinally the entire length of sides 20 and 22 of the de-aggregation chamber 14. See also FIGS. 6-9. Accordingly, inlet 68 preferably extends the entire length of de-aggregation chamber 14 and preferably extends at least the length L of bale 28. Accordingly, all of rotary valve 34 has an open upper end which is positioned to receive insulation which falls downwardly from lower de-aggregation member 32. In addition, as exemplified in FIG. 10, it is preferred that inlet 68 is directly below lower de-aggregation member 32 and, more preferably, directly below shaft 40 of lower de-aggregation member 32. An advantage of this design is that the de-aggregated insulation does not have to be directed towards one particular end 24, 26 so as to enter the rotary valve. Accordingly, the amount of material for unit area of inlet 68 that enters the rotary valve 34 may be minimized thereby enhancing the ability of air traveling longitudinally through rotary valve 34 to separate and transport the de-aggregated insulation.

Feeder

Figure 3:
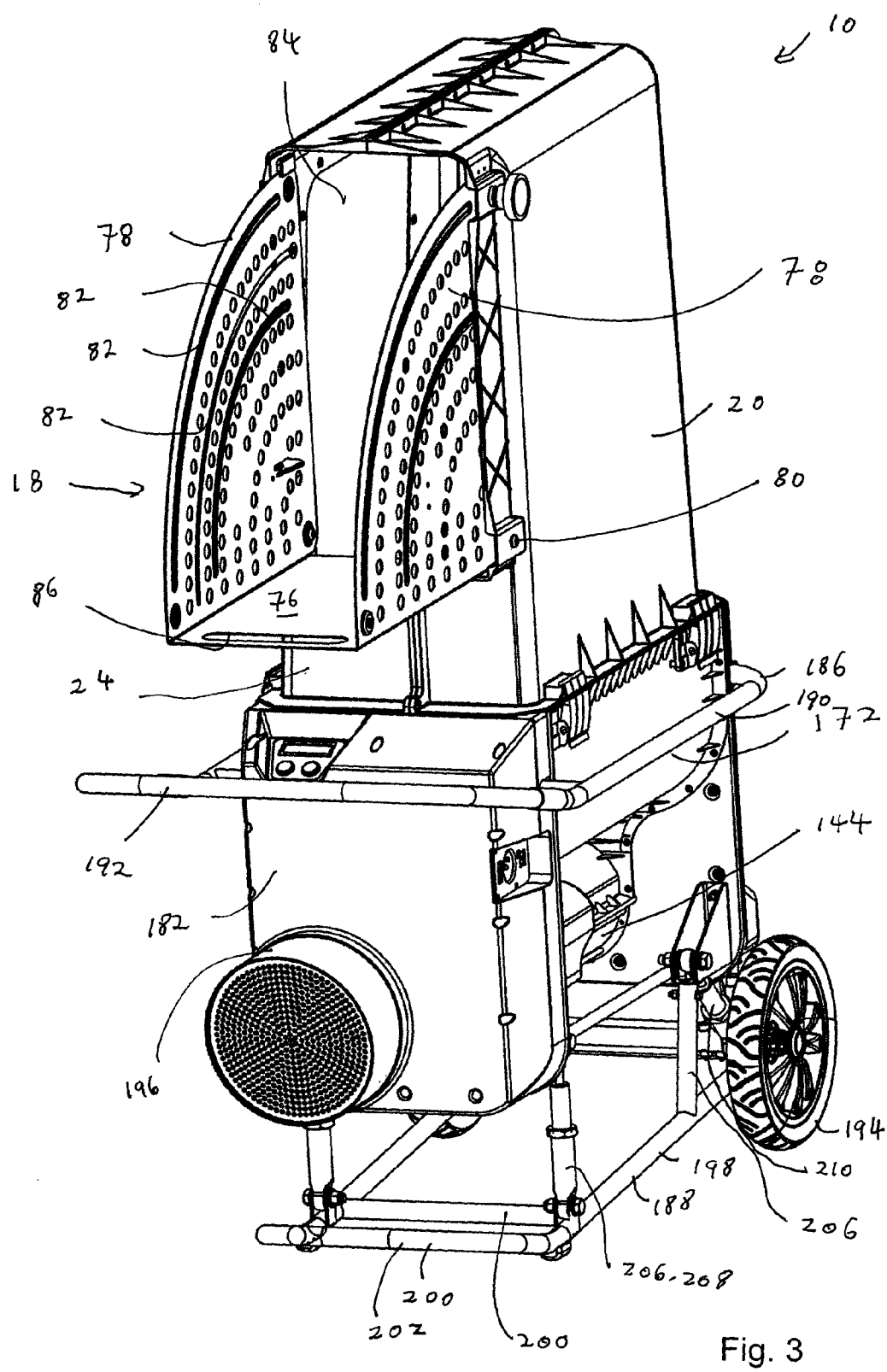
FIG. 3 is a perspective view from the front and to one side of the machine of FIG. 1 with the feed door open.
Figure 4:
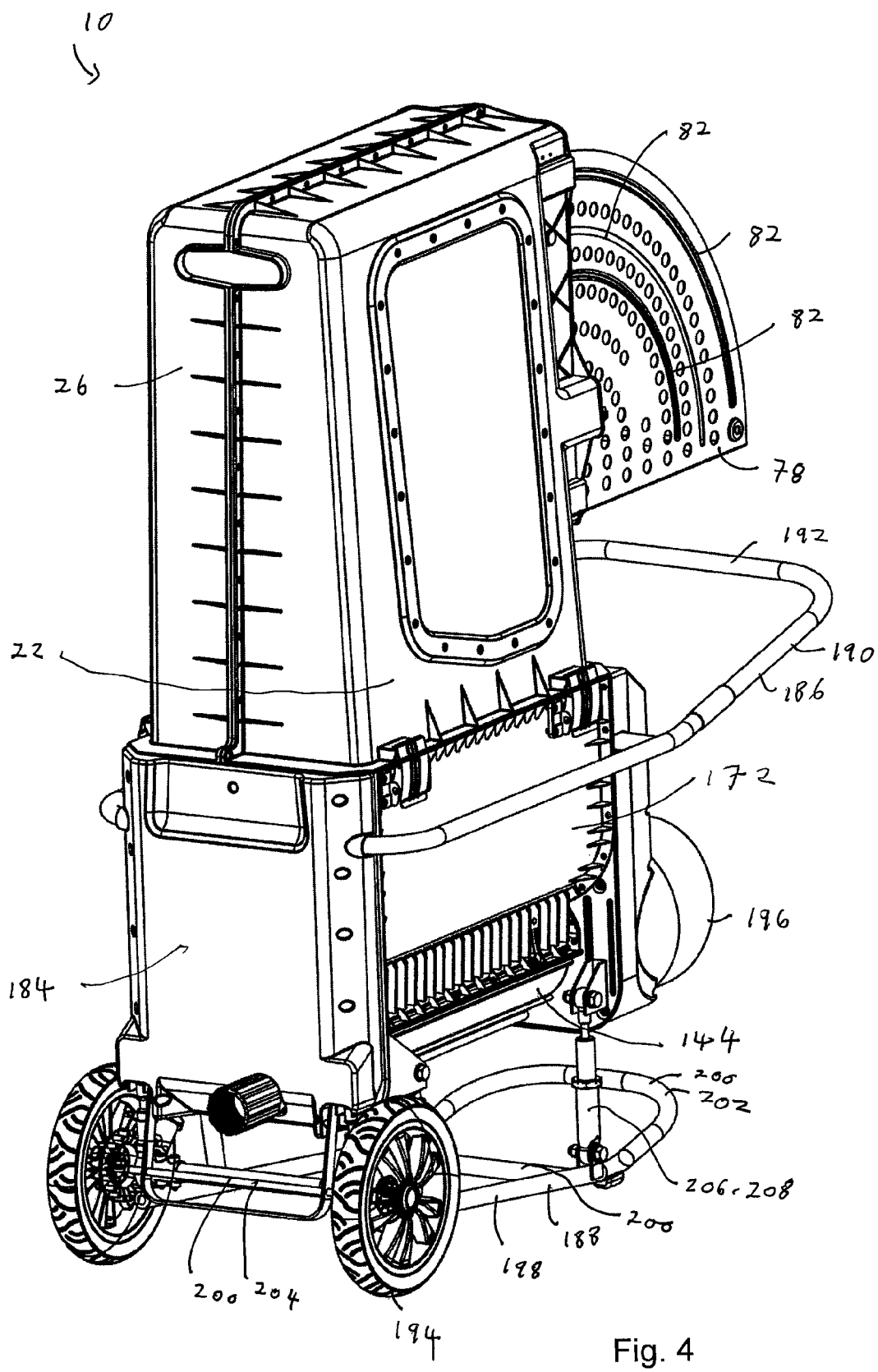
FIG. 4 is a perspective view from the rear of the machine of FIG. 1 with the feeder door open.
Figure 5:
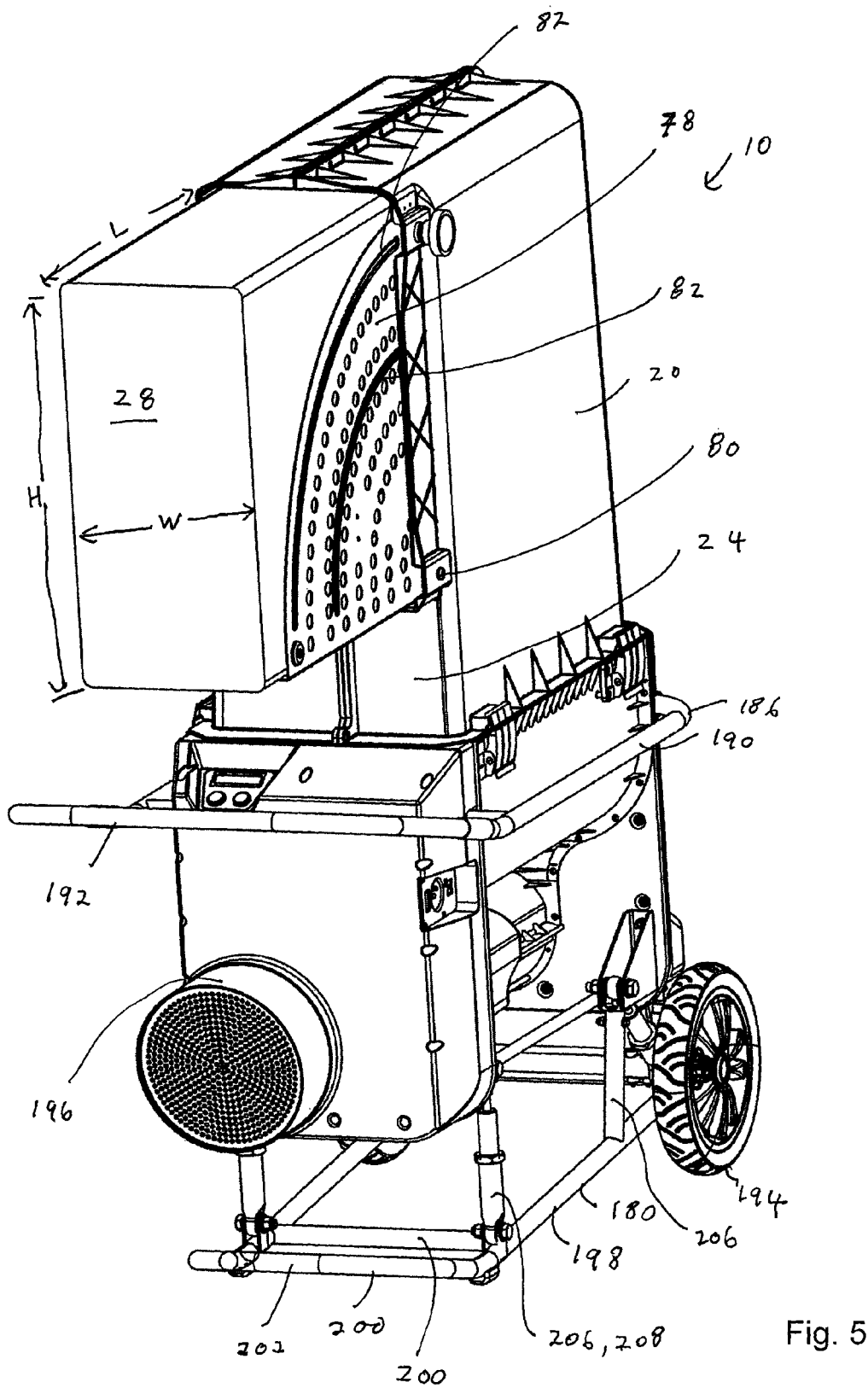
FIG. 5 is a perspective view from the front of the machine of FIG. 1 with the feed door open and a bale of insulation positioned on the feed door.

Referring to FIGS. 1, 3, and 5, an exemplary feeder 18. As exemplified, feeder 18 comprises a feeding shelf 76 on which bale 28 of insulation may be situated as it is slid into entrance zone 12. When opened, as shown in FIG. 3, an inlet 84 to entrance zone 12 is exposed. Inlet 84 is preferably sized so as to allow bale 28 to be slid into entrance zone 12 when bale 28 has expanded after being removed from its packaging. Accordingly, the entrance zone preferably has a height that is at least the same as the height of a decompressed bale. Similarly, inlet 84 has a width that is preferably at least the same as the width of a decompressed bale and may be essentially the same as the width of bale 28. Entrance zone 12 preferably has a length that is at least as long as the length of bale 28. Accordingly, when feeder shelf 76 is moved to the open position, bale 28 may be slid into entrance zone 12.

As exemplified in FIG. 8, the bottom of inlet 84 is preferably higher than the top of paddles 38 of upper de-aggregation member 30 and may be positioned somewhat there above. Accordingly, bale 28 may be slid along feeding shelf 76 and may then drop on top of paddles 38. Due to the sizing of entrance zone 12 as discussed herein, bale 28 may remain essentially in the upright position as it is moved into entrance zone 12 and may be oriented when in entrance zone 12 such that the bottom of bale 28 will extend more or less horizontally once positioned in entrance zone 12.

Feeder 18 is preferably presided with sidewalls 78. Sidewalls 78 are preferably sized so as to prevent a person from being able to extend their hand into entrance zone 12 and to contact paddles 38.

Preferably, sidewalls 78 extend inside entrance zone 12 when feeder 18 is in the closed position as exemplified in FIG. 1.

Feeder 18 may be openable by any means known in the art, e.g., it may be slidably mounted. Preferably it is rotatably openable, such as by being pivotally mounted to machine 10 via pivots 80.

As exemplified, one or both sidewalls 78 may be provided with one or more guide tracks 82 which may receive a protrusion or the like provided on the inner surface of e.g., sidewalls 20, 22 so as to guide feeder 76 as it is moved into the closed position or as it is moved into the open position.

A handle may be provided on feeder 18 to assist in opening and closing feeder 18. As exemplified in FIGS. 1 and 3, handle 86 may comprise a cut out in feeding shelf 76 which is sized to receive the fingers of a user's hand.

Preferably, the feeding shelf is positionable in an open position (e.g. rotated downwardly a sufficient extent) to permit bale 28 to be positioned horizontally in the de-aggregation chamber 14. Accordingly, it is preferred that feeding shelf 76 is positionable generally horizontally. For example, the feeding shelf may be at an angle from 80-100° to the vertical when in the open position.

Cover Layer of Paddles

As exemplified in FIG. 20, each paddle 38, 42 is preferably provided with a cover layer 94. Cover layer 94 is selected from a material that has good abrasion resistance and has a high co-efficient of friction. Cover layer 94 is preferably selected from rubber, synthetic rubber, silicone and mixtures thereof. As exemplified, paddle 38, 42 has a central hub 88 and a blade portion 90 extending outwardly therefrom. The blade portions are twisted or canted so that the leading face 92 of blade portions 90 are at an angle to the longitudinal axis of a shaft extending through opening 96 provided in central hub 88.

An advantage of cover layer 94 is that it may provide a greater amount of friction than blade portions 90. For example, typically, blade portions 90 are manufactured from metal and accordingly, provide a relatively lower friction surface. The cover layer provides enhanced friction and accordingly, results in a greater amount of de-aggregation for each rotation of paddle 38, 42.

Cover layer 94 may be mounted to paddle 38, 42 by any means such as by bonding, welding, mechanical fixation or the like. Most preferably, cover layer is removably mounted to paddle 38, 42. Accordingly, a further advantage of this design is that the cover layers may be replaced as they wear.

Cover layers 94 may be removably affixed to blades 38, 42 by any means known in the art. As exemplified, a removable mechanical fixation member is utilized. As exemplified, blade portions 90 are provided with openings 98 and cover layer 94 is provided with openings 100. When cover layer 94 is positioned adjacent blade portion 90, openings 98 and 100 are aligned. A mechanical fixation device such as rivet 102 may be inserted through openings 98, 100 so as to secure cover layer 94 in position. A washer 104 or the like may be provided to prevent rivet 102 from seating too far inwardly into cover layer 94. It will be appreciated that other removable mechanical fixation devices, such as nuts and bolts and the like may be utilized.

It will be appreciated that, preferably, the portion of rivet 102, or any other affixation which is positioned on leading edge 46 is preferably recessed into cover layer 94.

Cover layer 94 preferably has a sufficient thickness to avoid frequent replacement of the cover layer. The cover layer may have a thickness of from 0.1-1" and preferably, it is about 0.25".

As exemplified, cover layer 94 is provided so as to overlie all of blade portion 90 of paddle 38, 42. In a preferred embodiment, the machine 10 comprises upper and lower de-aggregation members 30 and 32 which are interleaved. If the paddles are so interleaved, then it is preferred that the cover layer extend radially along each paddle 38, 42 for a distance at least equal to the length of the portion of the paddles which are interleaved. Accordingly, at least the portions of the paddles 38, 42 which are interleaved are provided with the cover layer. More preferably, the cover layer extends radially along each paddle for a distance at least equal to 120% of the distance that the paddles are interleaved.

Mounting of the Paddles on a Shaft

Paddles 38, 42 may be mounted on shafts 36, 40 by any means known in the art. Preferably, paddles 38, 42 are provided with a radial inner engagement surface 108. Shafts 36, 40 are also preferably provided with a seating surface 110 (see for example FIG. 19). As exemplified therein, radial inner engagement surfaces define the perimeter of opening 96 in central hub 88 of paddle 38, 42. The radial inner engagement surface and seating surface 108, 110 are complementary and, accordingly, when paddle 38, 42 is slid onto shaft 36, 40, paddle 38, 42 must be at a particular orientation so that surfaces 108, 110 are aligned. Preferably, the perimeter of opening 96 of central hub 88 is slightly larger than the perimeter of shaft 36, 40. Accordingly, when paddle 38, 42 is positioned on shaft 36, 40, the contact between seating surfaces 108, 110 will prevent rotation of paddle 38, 42 around shaft 36, 40.

Figure 19:
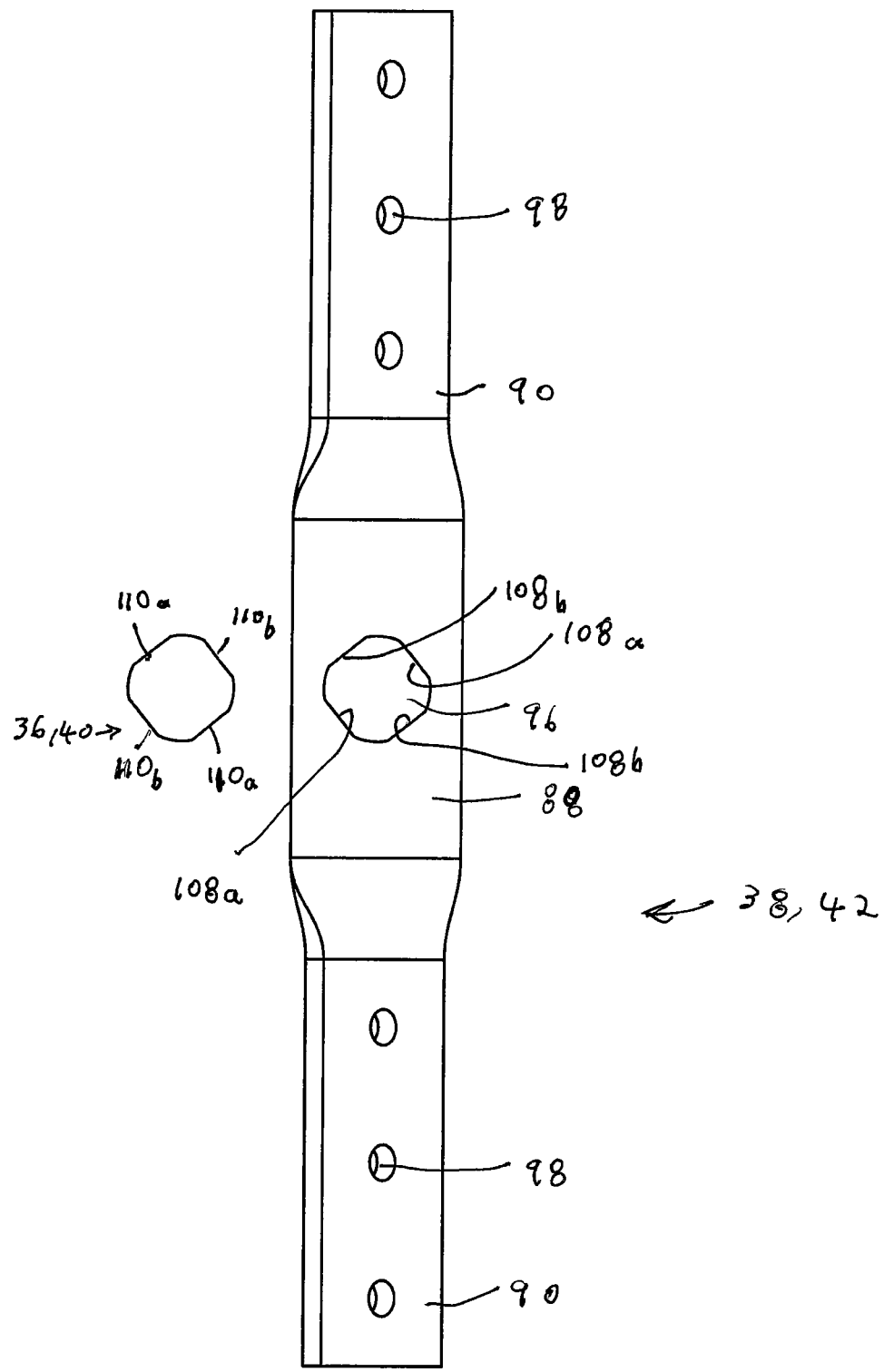
FIG. 19 is an end view of an embodiment of a shaft of the lower de-aggregation member and a paddle (without a coating layer) for slidable seating on the shaft of the lower de-aggregation member.

An advantage of this design is that paddle 38, 42 is mounted on shaft 36, 40 at one of the preset angular orientations. As exemplified, the shaft 36, 40 has four seating surfaces 110. In the preferred embodiment, lower de-aggregation member 32 comprises paddles which are oriented 90° apart. Referring to FIG. 19, it will be appreciated that the seating surfaces 110 are configured such that seating surfaces 110*a* are at 90° to seating surfaces 110*b*. Accordingly, the paddles will be positioned in the preset orientation once slid onto shaft 38, 42. The paddles may be mounted on the shaft by, e.g., mounting a first paddle with radial inner engagement surfaces 108*b* positioned on seating surfaces 110*b*. The next paddle may be mounted with radial inner engagement surfaces 108*b* mounted on seating surfaces 110*a*. Accordingly, the second paddle will be automatically positioned at an angular orientation that is 90° to the first paddle. Accordingly, an advantage of this design is that the paddles may be mounted at a pre-fixed orientation so as to reduce manufacturing error. In addition, pins, set screws, or the like are not required for positioning the paddles at a set angular orientation, and, therefore, no member is needed to pierce shaft 36, 40, thereby preventing the structural integrity of the shaft from being compromised.

Preferably, spacers 112 are provided between adjacent paddles 38, 42. Preferably the spacers 112, like paddles 38, 42, are slidably mounted onto shaft 36, 40. The spacers may have a circular interior profile and need not have a profile that matches the perimeter of shaft 36, 40. Accordingly, spacers 112 may rotate about shaft 36, 40.

Spacers 112 preferably have a length such that, when mounted between adjacent paddles 38, 42 on shaft 36, 40. Paddles 38, 42 are positioned a preset distance apart. As exemplified in FIG. 17, the spacers may have varying lengths. As exemplified therein, the end spacer 112*b* is about half the length of the remaining spacer 112*a*.

Spacers 112 may be secured to shaft 36, 40 by any means known in the art. For example, they may be mounted thereto by a set screw. More preferably, a member is affixed to the ends of the shaft when the spacers and paddles have been placed thereon to prevent the spacers and paddles from sliding off of the shaft. The member preferably applies compressive force to the spacers and the paddles. For example, the end of shaft 36, 40 may be threaded and one and, preferably, two locking nuts 114 may be threadedly mounted on the end of shaft 36, 40. When locking nuts 114 are tightened on shaft 36, 40, then spacers 112 are pushed into engagement with paddles 38, 40. Spacers 112, in combination with locking nuts 114 or other fixation members, therefore secure paddles 38, 42 at pre-determined spacings along shaft 36, 42.

In an alternate embodiment, it will be appreciated that spacers 112 may be used without the co-operating engagement and seating surfaces 108,110.

Outlet Converter

Figure 6:
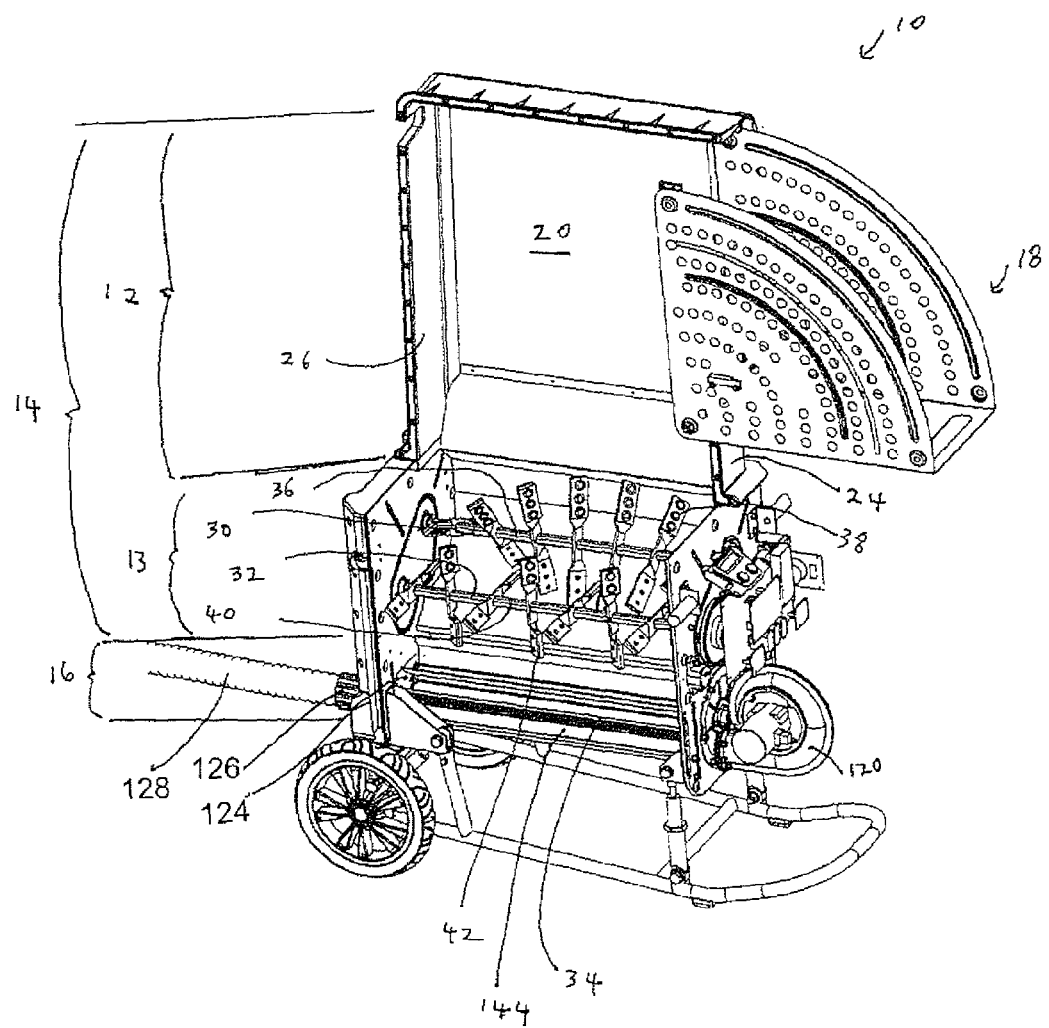
FIG. 6 is a partially cut away side perspective view of the machine of FIG. 1 with the feed door in the open position.
Figure 7:
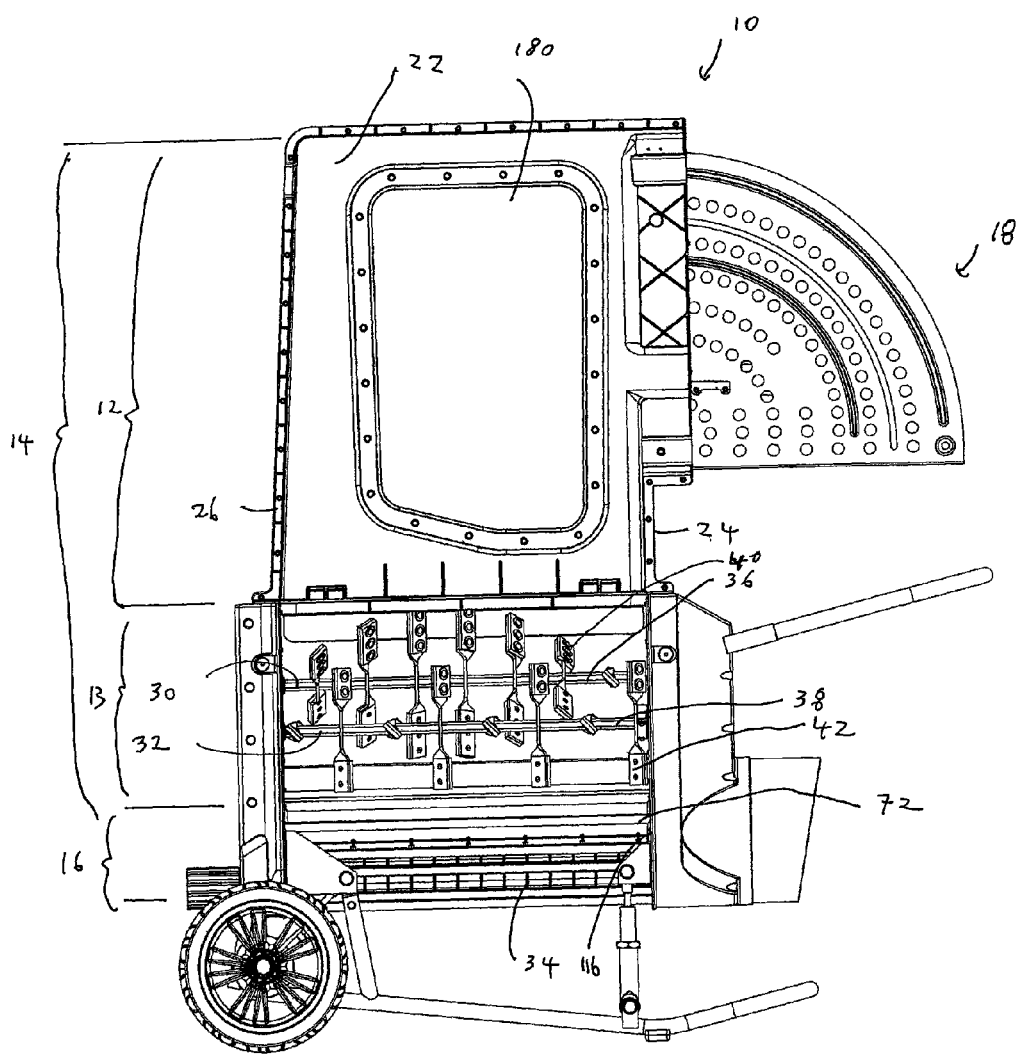
FIG. 7 is a partially cut away side view of the FIG. 1 with a feed door in the open position.

As exemplified in FIGS. 6 and 7, rotary valve has an inlet end 116 having an air inlet 118 (see FIG. 10) and a blown insulation outlet 122 provided at outlet end 124 of rotary valve 34. A blower 120 is preferably provided at inlet end 116 and is preferably provided as part of machine 10. Accordingly, a linear air flow path may be defined between the outlet of blower 120 and blown insulation outlet 122.

Figure 21:
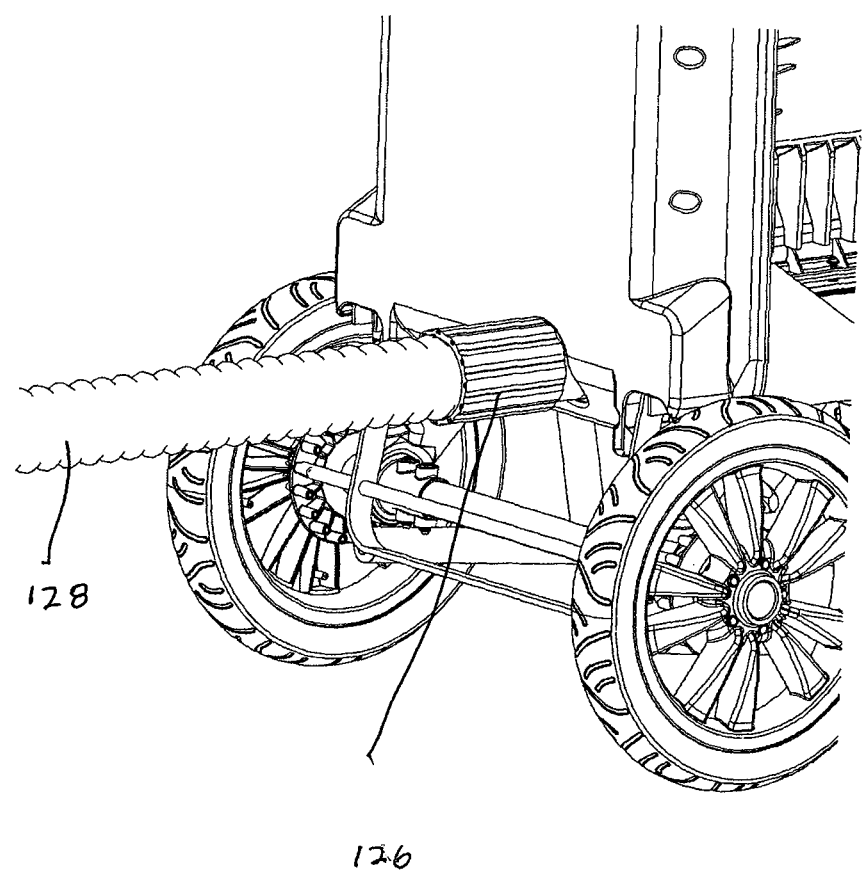
FIG. 21 is an enlarged view of the outlet conduit attached to the machine of FIG. 1.
Figure 22:
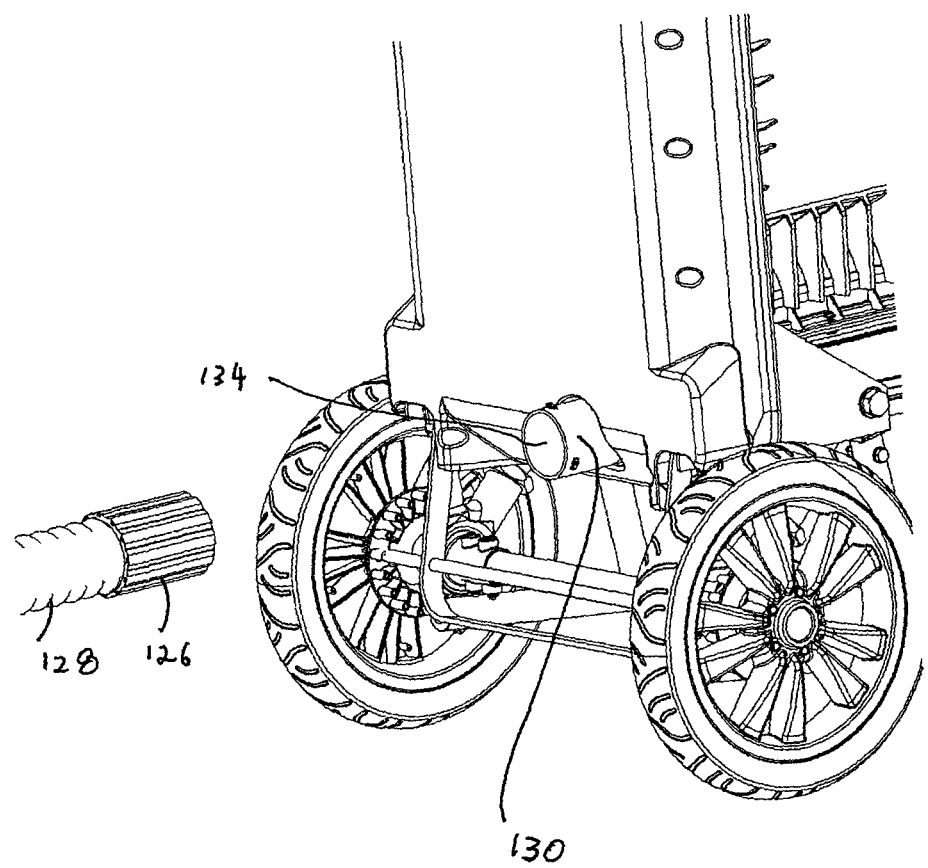
FIG. 22 is a exploded view of FIG. 21 showing the outlet conduit removed from the machine.
Figure 23:
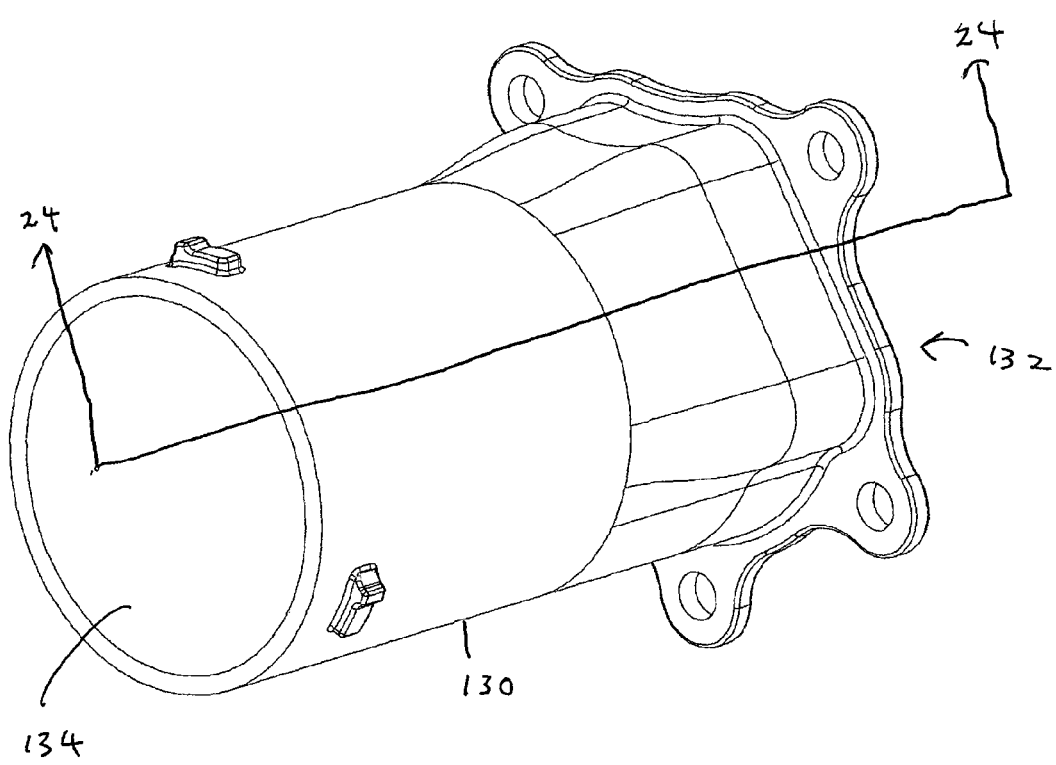
FIG. 23 is a perspective view of the outlet converter shown in FIG. 22.

Preferably, a delivery conduit, such as a flexible conduit or hose 128 is mounted and, preferably, removably mounted to outlet end 124 of rotary valve 34. For example, a releaseable coupling member 126 may be utilized. Releaseable coupling member 126 may be mountable, e.g. on outlet converted 130 (see FIGS. 21 and 22). Releaseable coupling member 126 may be releasably mounted to outlet converter 130 by any means known in the art as such as by a rotational coupling (e.g. a screw thread or a bayonet mount), or by pins, screws, or the like.

Figure 24:
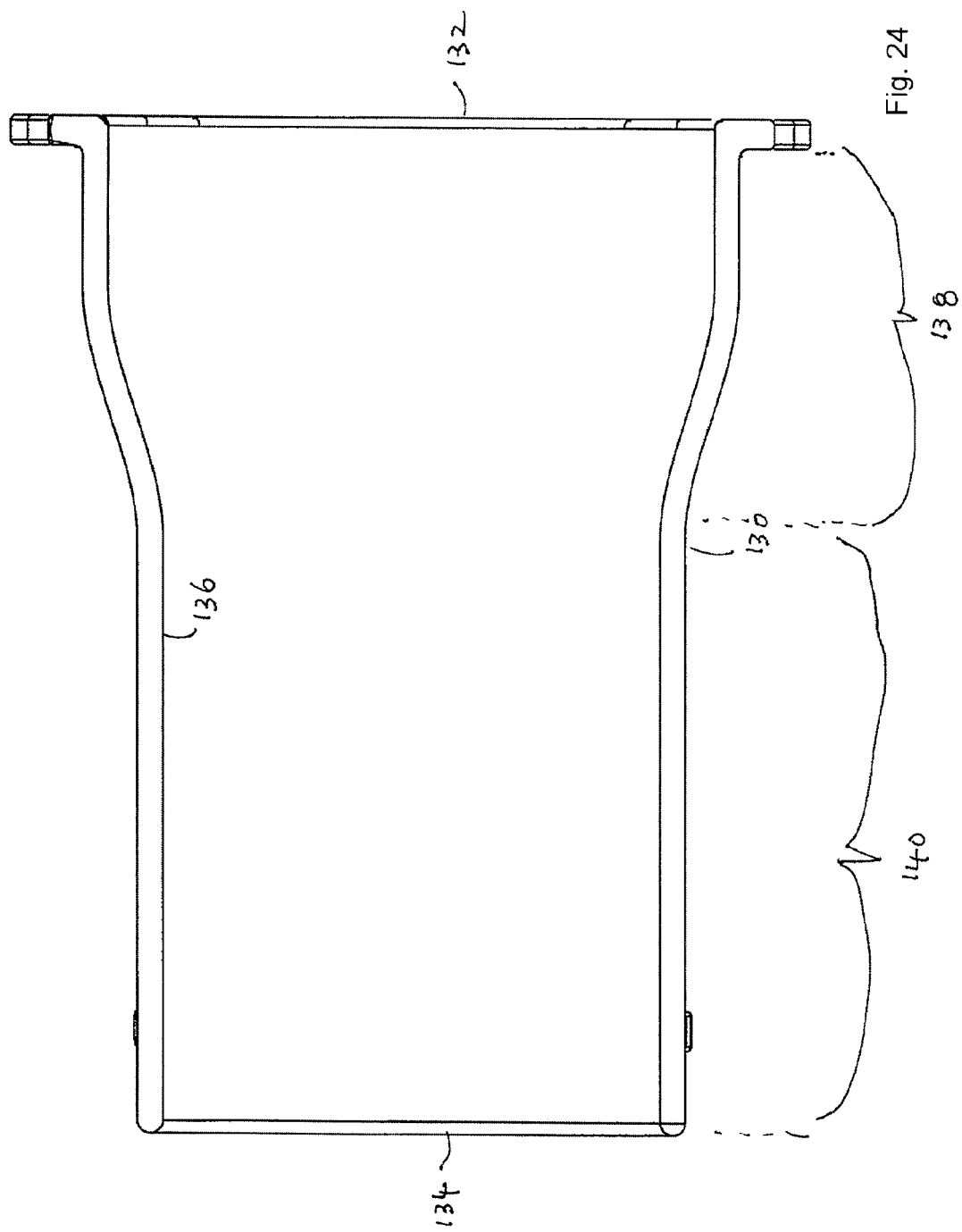
FIG. 24 is a longitudinal sectional view along the line 24-24 of FIG. 23.
Figure 25:
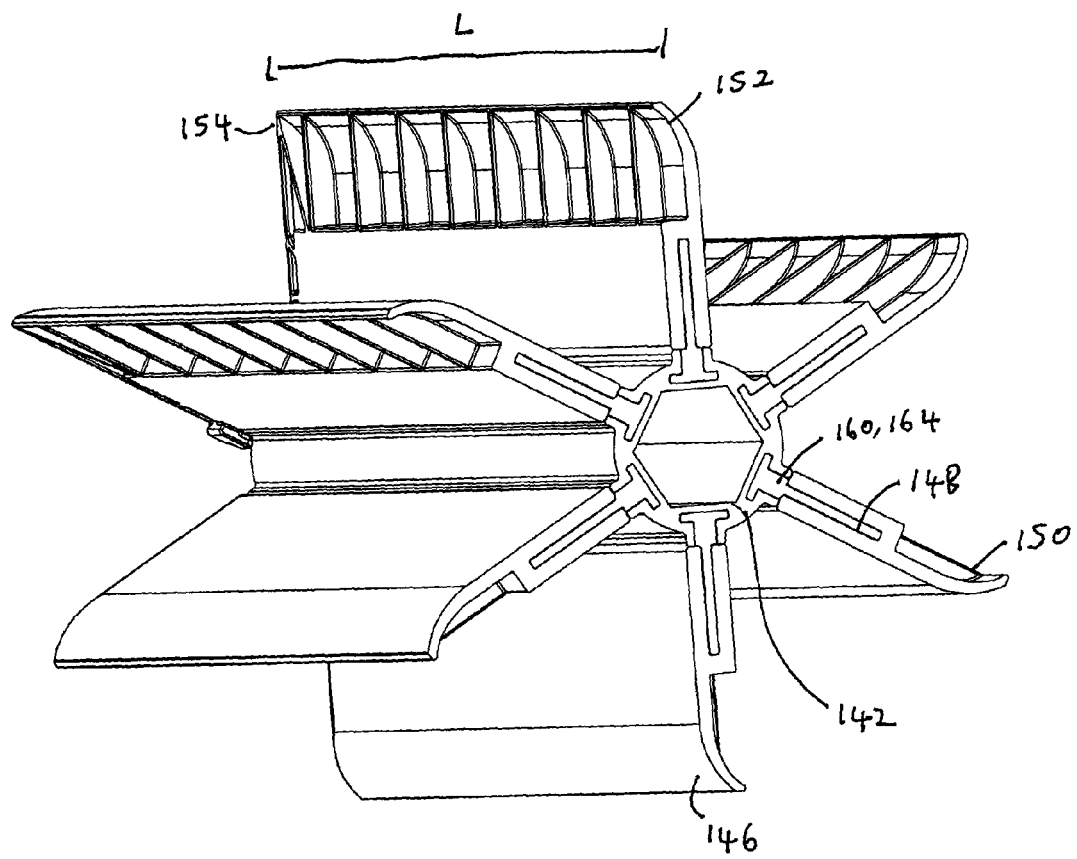
FIG. 25 is a perspective view of the shaft and vanes of a rotary valve.
Figure 26:
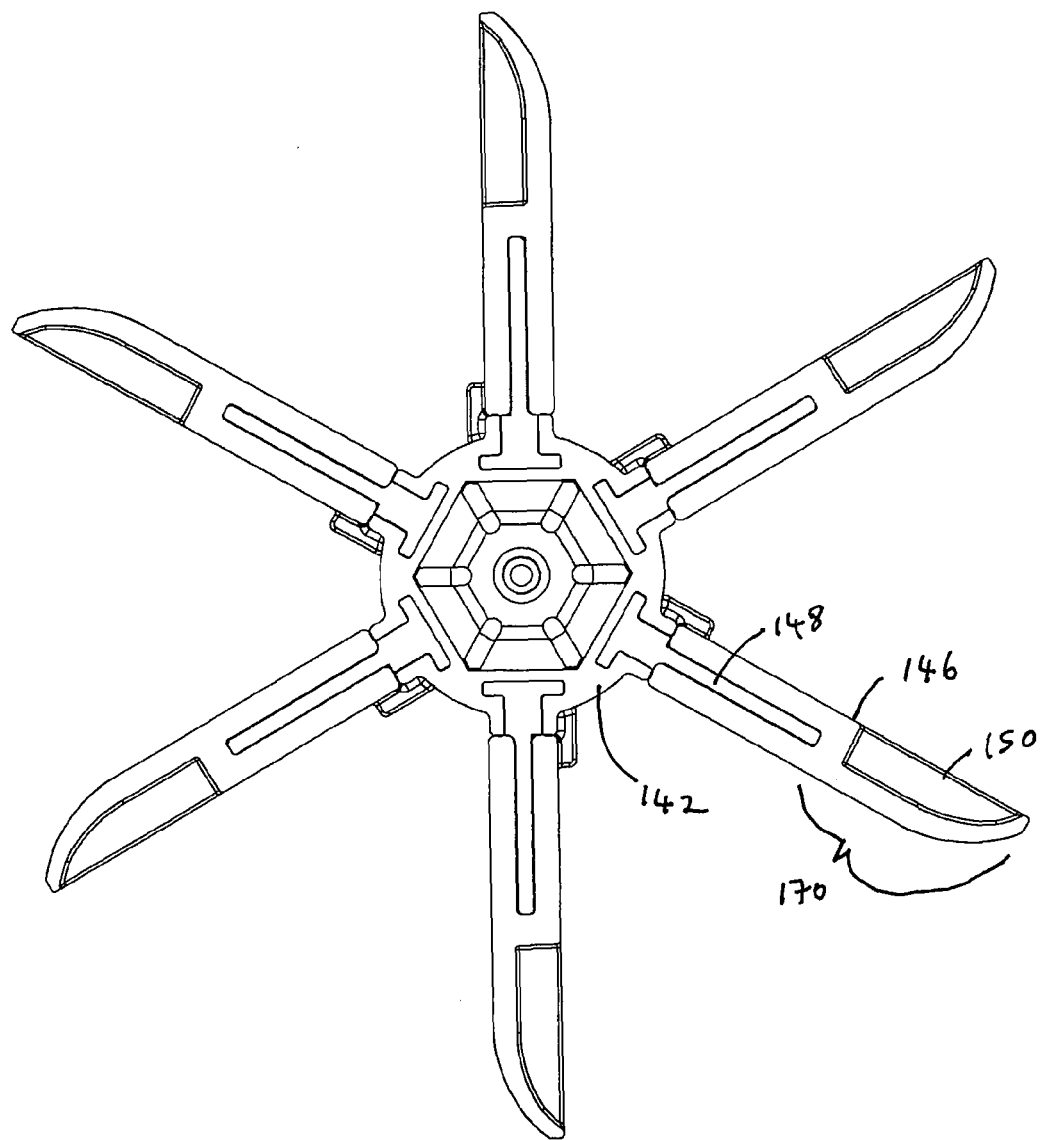
FIG. 26 is an end view of the shaft and vanes of FIG. 25.
Figure 27:
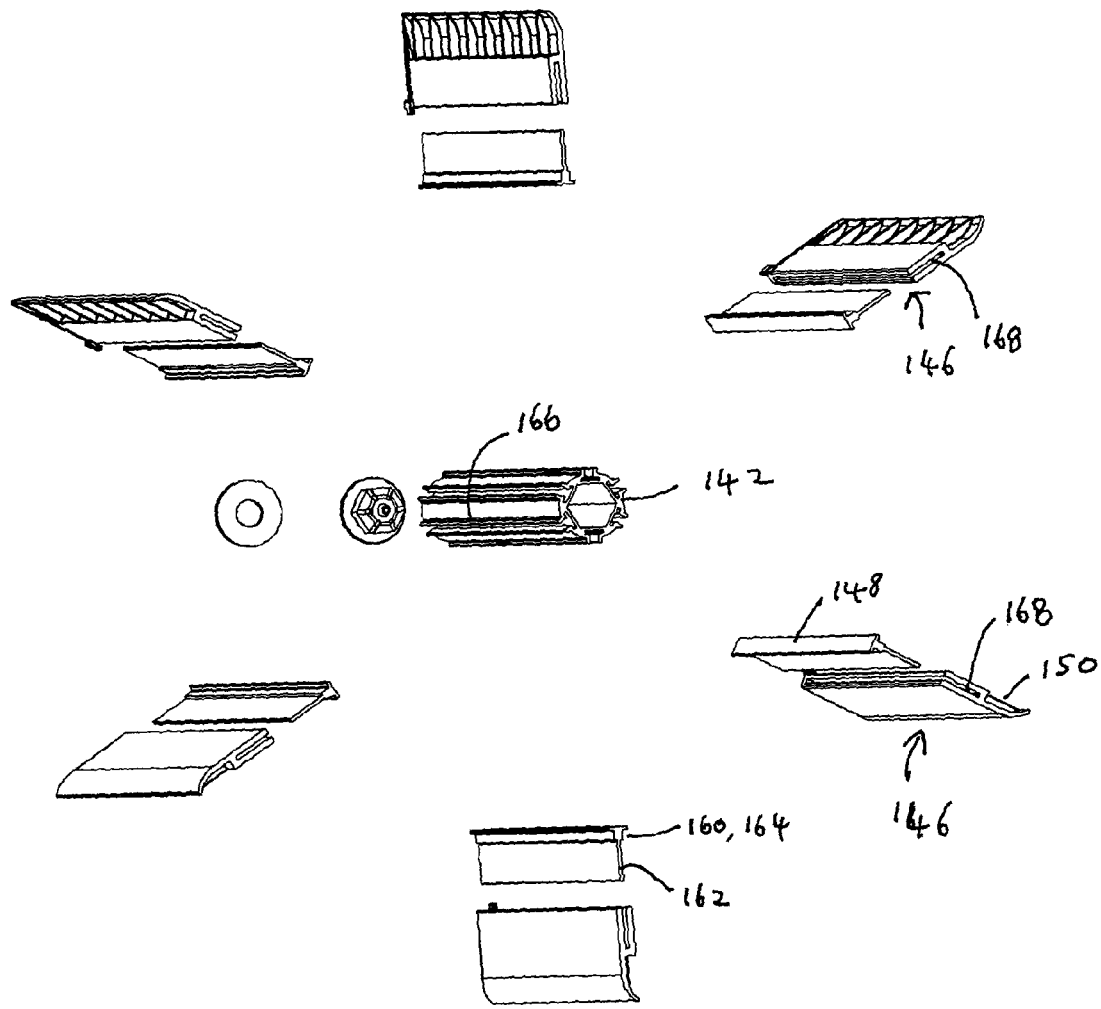
FIG. 27 is a perspective exploded view of the shaft and vanes of the rotary valve FIG. 25.
Figure 28:
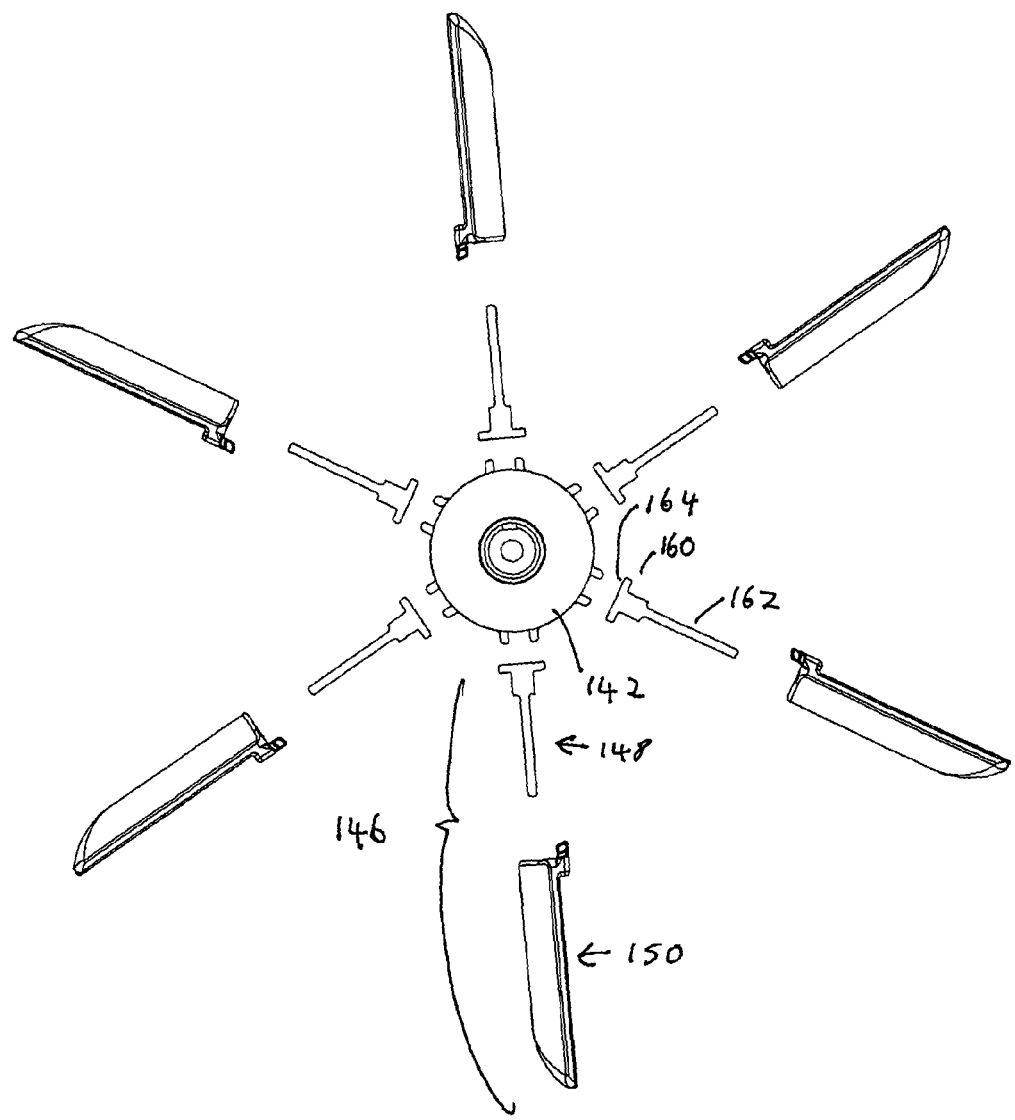
FIG. 28 is an end exploded view of the shaft and vanes of the rotary FIG. 25.
Figure 29:
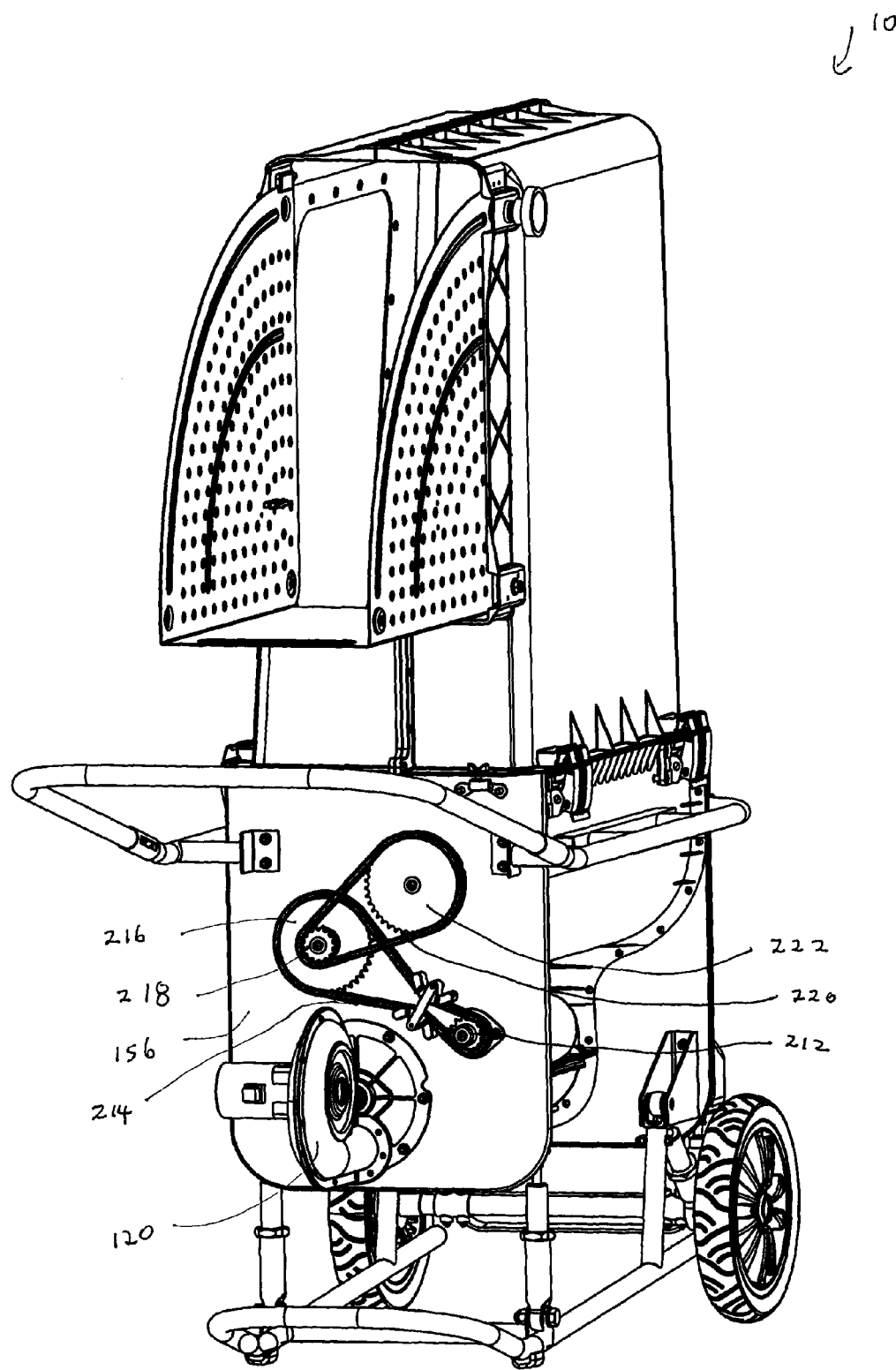
FIG. 29 is a perspective view of the front of the machine of FIG. 1 with the lower front cover removed to show part of the drive mechanism.
Figure 30:
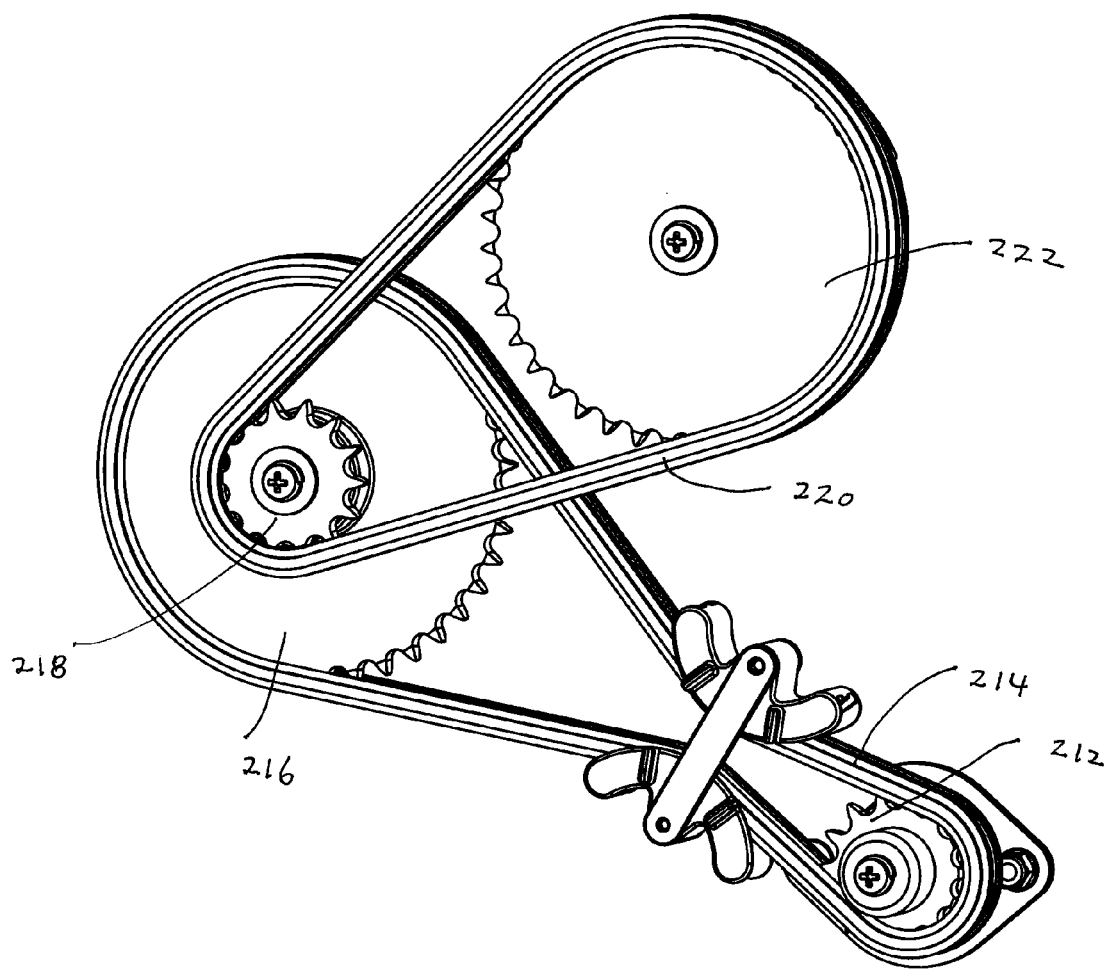
FIG. 30 is an enlarged view of the drive mechanism of FIG. 29 removed from the end plate.
Figure 31:
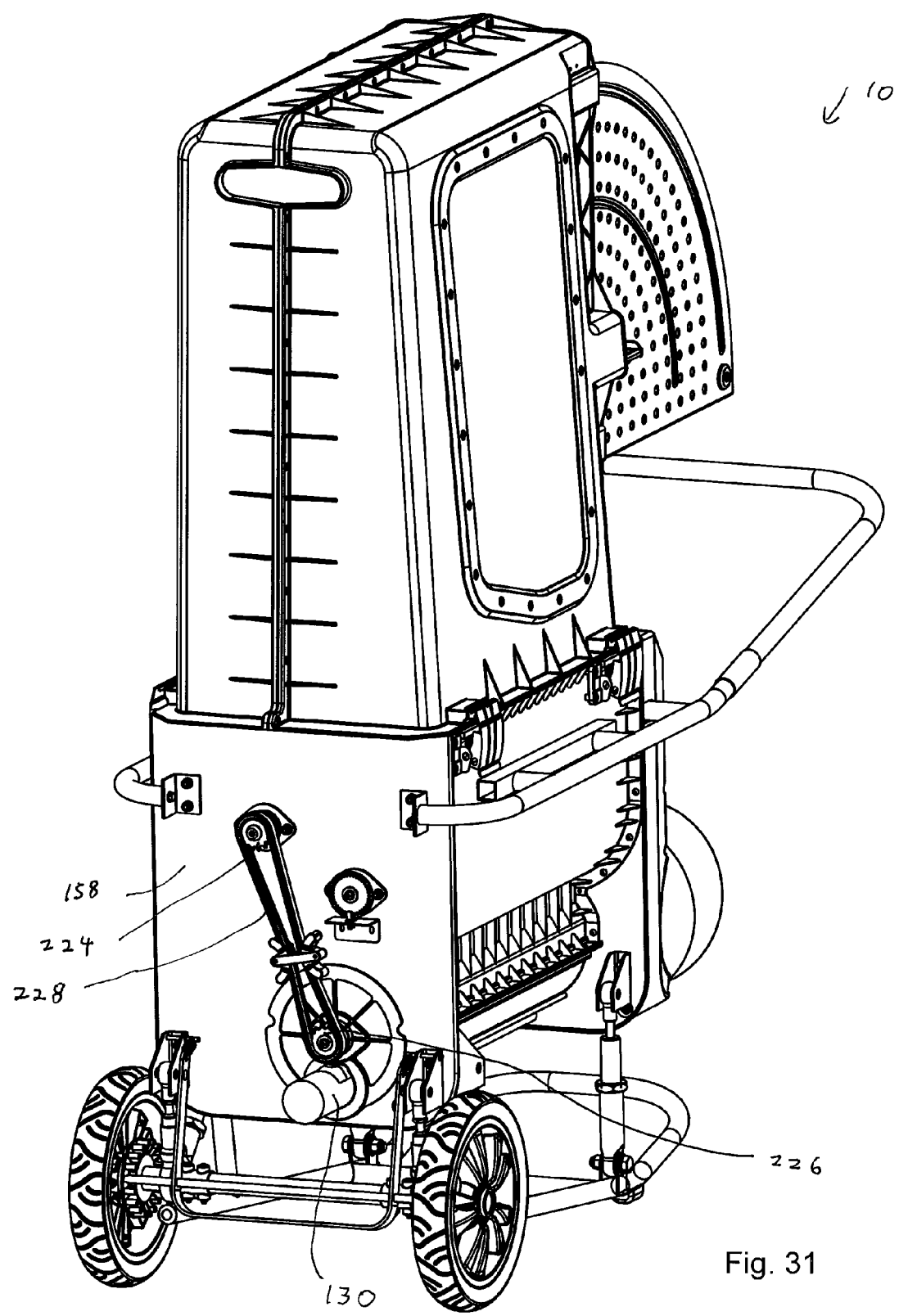
FIG. 31 is a perspective view of the rear of the machine of FIG. 1 with the lower front cover removed to show another part of the drive mechanism; and, FIG. 32 is an enlarged view of the drive mechanism of FIG. 31 removed from the end plate.
Figure 32:
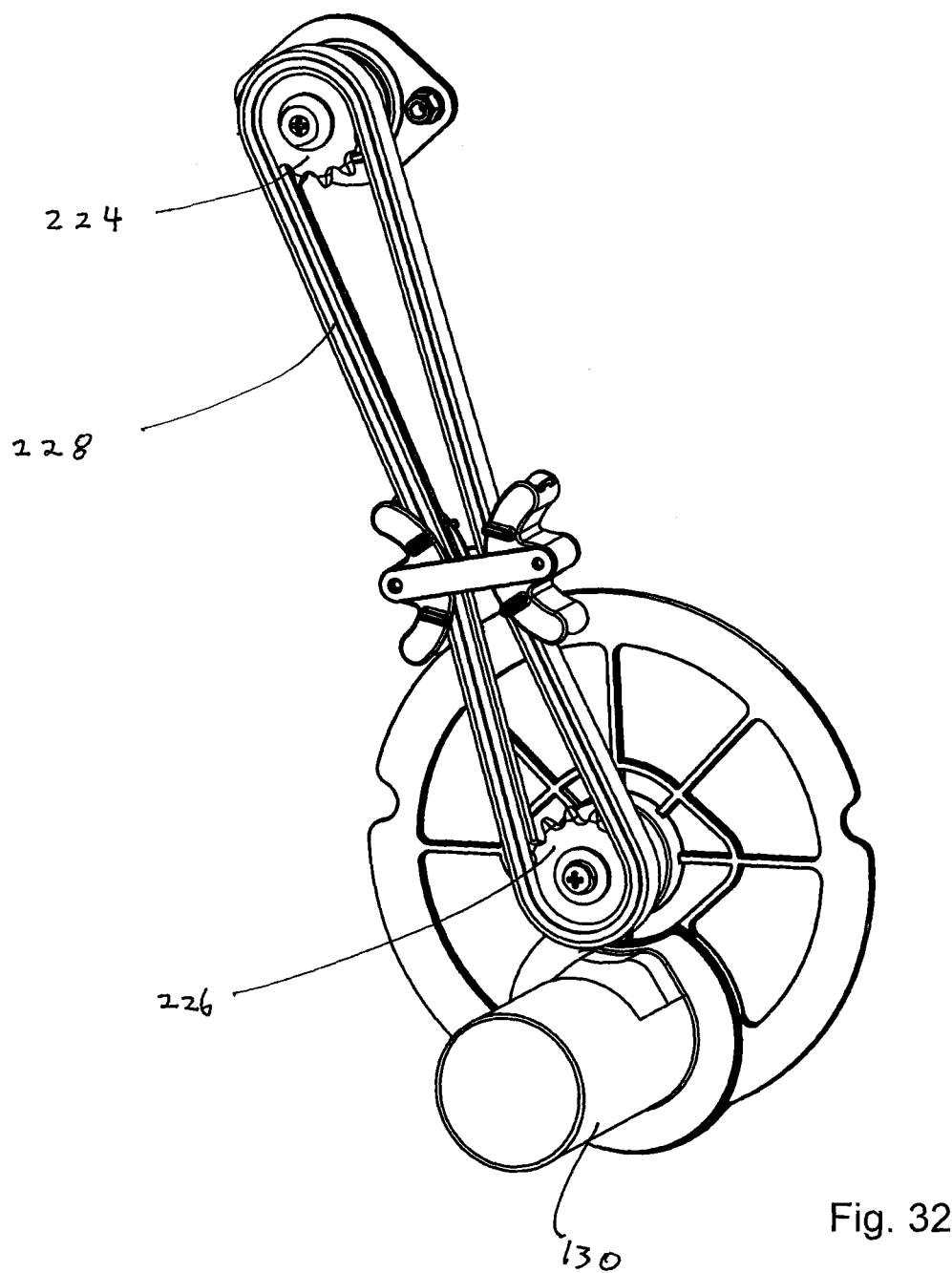

Typically, the outlet converter has an inlet end 132 having a cross-sectional area and an outlet end 134 having a cross-sectional area that differs to the inlet and, is preferably less than the cross-sectional area of inlet end 132 (See FIG. 24). Accordingly, as the blown insulation travels through outlet converter 130, the rate of flow increases due to the throttling effect produced by the narrowing of the passage through outlet converter 130.

Preferably, as exemplified, inner surface 136 of outlet converter 130 has an absence of discontinuities. Discontinuities can disrupt the air flow passing through outlet converter 130 and can provide locations at which the insulation may bridge and accordingly clog part or all of the passage through outlet converter 130. Accordingly, inner surface 136 may consist of sections which are curved and sections which are straight. As exemplified in FIG. 24, outlet converter has an upstream section 138 wherein the inner surface is curved inwardly and a downstream section 140 wherein the inner surface is generally straight (e.g. it may define a passage having parallel walls). Optionally, it will be appreciated that inner surface 136 may be continuously curved and may be flared, e.g., inwardly from inlet end 132 to or towards outlet end 134.

Rotary Valve

In another embodiment, rotary valve comprises a shaft 142 rotatably mounted in machine 10 having a plurality of vanes 146 radiating out therefrom. Shaft and vanes 142, 146 rotate inside a housing having a curved wall 144 (see for example FIGS. 11 and 12).

Referring to FIGS. 25-28, a preferred design of rotary valve 34 is exemplified. As shown therein, vanes 146 comprise a rigid backbone 148 and a flexible material 150 provided thereon. The rigid backbone may be made of various materials and is preferably made of metal. The flexible material may be any flexible material utilized in a rotary valve vane and is preferably a natural or synthetic rubber. An advantage of this design is that the rigid backbone prevents vane 146 twisting along its length as it rotates in the housing. The vanes 146 of rotary valve 144 preferably have a Length which is at least as long as the length of a bale 28. Accordingly, vanes 146 may be relatively long. Due to this length, if vanes 146 comprise only a flexible material, one end 152 of vane 146 may be angularly offset with respect to opposed longitudinal and 154 of vane 146 as rotary vane rotates. The provision of the rigid backbone 148 provides dimensional stability of vane 146 along its length thereby inhibiting and, preferably, preventing twisting of vane 146.

As shown in FIG. 13, rotary valve is mounted to end plates 156, 158 which are at opposed longitudinal ends of shaft 142. Wall 144 may also be mounted to plates 156, 158. In order to reduce the friction between rotary valve and end plates 156, 158, the inner surface of end plates 156, 158 may be anodized. However, as vanes 146 may be dimensionally stable in the longitudinal direction due to backbone 148, it is not necessary to anodize the interior surface of wall 144, although the interior surface of wall 144 may optionally be anodized.

As exemplified in FIGS. 25-28, rigid backbone preferably comprises a mounting end 160 and a vane portion 162 extending radially outwardly from mounting end 160. Mounting end 160 is preferably removably mounted and, more preferably slidably removably mounted, to shaft 142. For example, mounting end 160 may have a T-shaped end portion 164 which may be slideable receivable in a mating groove 166 provided on shaft 142. Accordingly, vanes may be removeably mounted and, preferably, slideably mounted on shaft 142. It will be appreciated that vanes 146 may be mounted to shaft 142 by other means such as by welding, bonding, and mechanical fixation member such as a screw or the like.

As exemplified, flexible material 150 has a slot 168 for the sliding receipt therein of vane portion 162. Accordingly, flexible material 150 covers both sides of vane portion 162 and has a radial outer portion 170 which does not have vane portion 162 therein, and is accordingly more flexible. It will be appreciated that flexible material 150 may be mounted to rigid backbone 148 by other means such as mechanical fixation members (e.g. rivets, screws) an adhesive, or by utilizing a barbed surface on vane 162. It will further be appreciated that vane portion 162 need not be a continuous member but may comprise a plurality of discrete members.

Exoskeleton

In accordance with another preferred embodiment, machine 10 utilizes an exoskeleton to dimensionally stabilize the structure. An advantage of this design is that the interior of the machine may not include frame members to provide structural integrity to the machine. Interior frame members would require either a further inner wall to provide a smooth interior surface of de-aggregation chamber 14 (which would add to the weight of the machine and the complexity of the manufacturing of the machine) or would provide locations where fiber could bridge thereby jamming or partially interrupting flow of insulation through machine 10.

As exemplified in FIGS. 1-4 and 13, machine 10 has an entrance zone 12 which has opposed side walls 20 and 22 and end walls 24, 26. Below this, de-aggregation zone 13 and discharge zone 16 are provided. De-aggregation zone and discharge zone are positioned between opposed end plates 156 and 158. Side walls 172 of de-aggregation zone 13 extend between opposed end walls 156, 158. In addition, as exemplified in FIG. 13, the rotary valve chamber is defined at its lower end by curved wall 144. Side walls 172 may be secured to end plates 156, 158 by, e.g. screws, rivets, welding, or the like. As exemplified in FIG. 1, a plurality of screws 174 are utilized. An advantage of screws is that part or all of the de-aggregation zone 13 and the discharge zone 16 may be disassembled to services parts, such as to replace cover layers 94, vanes 146, flexible material 150 or other parts that may wear. Curved wall 144 may be releasably secured to sidewalls 172 and/or end walls 156,158. Once again, curved wall may be permanently secured in place such as by welding or an adhesive, or may be releasably secured in position, such as by screws 174, rivets or the like.

As exemplified, entrance zone 12 is removable mounted to the portion of the machine defining de-aggregation zone 13 and discharge zone 16. For example, entrance zone 12 may be a complete assembly which is removeably mounted to the rest of the machine by, e.g., pivoting or luggage locks. The luggage lock has a longitudinally extending portion pivotally mounted, e.g., at one end, and rotatable to a closed position in which the end distal to the pivot end is secured in position. Alternate releasable securing means may be used, such as screws, wing nuts or the like. Alternately, entrance zone 12 may be permanently secured into position such as by an adhesive, welding, or by forming walls thereof as part of the walls of, e.g., de-aggregation zone 13. Preferably, entrance zone is removeably mounted so as to facilitate the transport of machine 10. Some or all of the walls of entrance zone 12 may be made of plastic. In particular, it will be appreciated that entrance zone 12 may be made from two molded plastic members which are joined along the centerline 178 which is indicated in FIG. 1. Optionally, a window 180 may be provided in one or both of sidewalls 20, 22.

End plates 156, 158 are preferably load bearing members and, more preferably the only load bearing members other than the exoskeleton. Accordingly, these plates are preferably made of metal and provide mounting points for the various operating components of machine 10. For example, upper and lower de-aggregation members 30, 32 may be mounted to end plates 156, 158. Similarly, a rotary valve 34 may also be mounted thereto. In addition, motor 52 as well as blower 120 may also be mounted thereto. In order to protect the operating components, bearings, gearing and the like that may be utilized, outer protective covers 182, 184 may be provided. It will be appreciated that outer covers 182, 184 may be made of plastic. Similarly, side walls 172 and curved wall 144 may also be made of plastic. However, metal may also be used if desired.

In order to dimensionally stabilize end walls 156, 158 to which the operating components are preferably attached, an exoskeleton is provided. Preferably, the exoskeleton comprises an upper frame member 186 and a lower frame member 188. The frame members may be directly or indirectly and, preferably, directly attached to end walls 156, 158. Accordingly, it will be appreciated that upper frame member 186 may secure the upper portion of end plates of 156, 158 in a fixed position. Similarly, lower frame member 188 may secure the lower end of end plates 156, 158 in position. Accordingly, when assembled, the end plates 156, 158 in combination with frame numbers 186, 188 provide a dynamically stable structure for housing de-aggregation zone 13 and discharge zone 16. It will be appreciated that each of frame members 186, 188 extend between end plates 156, 158 and need not extend across either or both of end plates 156, 158. However, as exemplified, it is preferred that upper frame member 186 includes both side members 190 as well as a cross member which is positioned outwardly from one of the end walls e.g. end wall 156 so as to define a handle 192.

Handle 192 may beneficially be used to transport machine 10, especially if machine 10 provided with wheels 194. In addition, if handle 192 extends forwards efficiently, it may act as a bumper to protect the machine in case it falls over as well as to protect, e.g. blower air inlet 196 from impact.

As exemplified, upper frame member 186 extends directly outwardly from its attachment point to end walls 156, 158. However, upper frame member 186 may be positioned above or below the upper end of end plates 156, 158 such as by using vertically extending extension members. For example, lower frame member 188 is positioned below the bottom of end plates 156, 158 and is attached thereto by vertically extending members. However, it will be appreciated that lower frame member 188 may be attached by horizontally extending struts directly to the lower end of plates 156, 158 in a similar manner that upper frame member 186 is attached.

Preferably, as exemplified, lower frame member 188 comprises side members 198 which are dimensionally stabilized by one or more cross struts 200. As exemplified, a plurality of cross struts 200 is provided. One of the cross struts may be provided at or adjacent the front end of machine 10 (e.g. the end width feeder 18) and may extend forward as sufficient amount to define bumper 202. As exemplified, for example in FIG. 8, bumper 202 may be positioned sufficiently forward so as to protect blower air inlet 196 or any other member that extends outwardly from machine 10.

One of the cross members may also function, e.g. as axle 204 for rear wheels 194.

Lower frame member 188 is secured to end walls 156, 158 by a plurality of vertically extending struts 206. As exemplified, for example, struts 206 extend upwardly from each side of the front and rear of side members 198. In addition, some or all of struts 206 may comprise shock absorbers 208. As exemplified, the front struts 206 comprise shock absorbers 208, which are pivotally mounted to both frame 198 and end wall 156.

Optionally, as exemplified, rear shock absorbers 210 may be provided in addition to or in lieu of front shock absorbers 208. Rear shock absorbers 210 may extend vertically as with front shock absorbers 208. Alternately, as exemplified, may extend upwardly at an angle. For example, rear struts 208 may be positioned adjacent wheels 194 and may be of a fixed length. Rear shock absorbers 210 extend at an angle upwardly from frame 198 (e.g., axle 204), to end plate 158. Preferably, a shock absorber 210 is pivotally mounted at each end to frame 198 and end plate 158.

An advantage of this design is that the shock absorbers, as opposed to the frame or the end plates 156, 158, will absorb dynamic stresses applied to machine 10 such as by the machine being dropped on the ground when delivered to a location or when a bale is dropped onto feeder shelf 76.

A further advantage of this design is that the lower frame member (namely side members 198 and cross struts 200) may define a skid plate for a machine as well as a mounting site for rear wheels 194.

Drive Mechanism

In accordance with another embodiment, the de-aggregation members 30, 32 and the rotary valve 34 may be driven by a single motor 52. The drive members driving the connecting these rotary members to motor 52 are preferably not all provided on the same end of machine 10. For example, as exemplified in FIGS. 29-32, the upper and lower de-aggregation members 30, 32 are drivingly connected to motor 52 on one end and the rotary valve is driven in the opposed end.

Accordingly, motor 52 may be mounted to end plate 156. Motor 52 is provided with a drive sprocket 212 provided on the output shaft. Lower de-aggregation member 32 is provided with a drive sprocket 216. Motor 52 is drivingly connected to lower de-aggregation member by first gear chain 214. In addition, lower de-aggregation member 32 is provided with a transfer sprocket 218 which is mounted adjacent drive sprocket 216 (e.g., adjacent each other on the end of shaft 40). Upper de-aggregation member 30 is provided with a drive sprocket 212. Second gear chain 220 is used to drivingly connect transverse sprocket 218 to a drive sprocket 222 of upper de-aggregation member 30. The opposed end of upper de-aggregation member 30 is provided with a second transfer sprocket 224. The same end of rotary valve 34 is provided with a drive sprocket 226. Accordingly, upper de-aggregation member 30 is drivingly connected to rotary valve 34 via third gear chain 228. Accordingly, it will be appreciated that two of the drive members are located on one end (e.g. torque produced by the drive chains 214, 220 is absorbed by end plate 156). Similarly, the torque produced by the third drive member gear chain 228 is absorbed by the opposed end plate 158. Accordingly, the torque produced by the drive members is provided on each end plate and not on a single end plate. An advantage of this design is that the torque produced by the use of a single motor is applied on either end of the machine and distributes the load more evenly.

It will be appreciated that, in other embodiments, other drive means, other than a drive chain, may be utilized, such as intermeshing gears, worm gears, or other means known in the art. In addition, it will be appreciated that either of the de-aggregation members and the rotary valve may be directly driven by motor 52 and the other two elements may be indirectly driven as exemplified herein. Accordingly, it will be appreciated that motor 52 may alternately be provided on end plate 158.

It will be appreciated that various modifications and additions may be made to any one or more of the embodiments and each of those are included within the scope of this disclosure. It will further be appreciated that any of the features disclosed herein may be used singularly or in combination with any one or more other embodiments disclosed herein.

The invention claimed is:

1. A machine for de-aggregating a bale of insulation and blowing de-aggregated insulation, the bale of insulation having a front, a rear, a first side, a second side, a first length extending in a forward/rearward direction, the machine having a height and a transversely extending length and comprising
    a de-aggregation chamber having an inlet end positioned above an outlet end, the de-aggregation chamber having first and second opposed end walls and a height, a length and a width and comprising a single upper de-aggregation member and a single lower de-aggregation member, each de-aggregation member comprising a longitudinally extending rotary mounted shaft having a drive end provided on the first side of the machine and an opposed end on the second side of the machine, a length and a plurality of paddles angularly staggered around the shaft and extending along the length of the shaft, the paddles of the upper de-aggregation member comprising first and second paddles having differing lengths and both the first and second paddles are interleaved with the paddles of the lower de-aggregation member whereby the first and second paddles pass between the paddles of the lower de-aggregation member;
    a feeder communicating with the inlet end of the de-aggregation chamber;
    a discharge zone comprising a longitudinally extending rotary valve having a drive end provided on the second side of the machine and an opposed end, an upper insulation inlet and an outlet, the upper inlet positioned below the lower de-aggregation member whereby insulation travels downwardly from the de-aggregation member into the rotary valve; and,
    a motor
    wherein the motor is drivingly connected to the drive end of the shaft of one of the upper and lower de-aggregation members, the drive end of the shaft of one of the upper and lower de-aggregation members is drivenly connected to the drive end of the shaft of the other of the upper and lower de-aggregation members and the opposed end of the shaft of the other of the upper and lower de-aggregation members is drivingly connected to the drive end of the rotary valve whereby torque produced by the motor is applied on each of the first and second sides of the machine and is distributed more evenly.

2. The machine of claim 1 wherein each first paddle comprises a first blade portion and each second paddle comprises a second blade portion and the first blade portions have a longer length than the second blade portions and the first blade portions of the paddles of the upper de-aggregation member have an overlap with the first blade portions of the paddles of the lower de-aggregation member that is from 30-50% of a length of the first blade portions of the paddles of the lower de-aggregation member-and the second blade portions of the paddles of the upper de-aggregation member have an overlap with the second blade portions of the paddles of the lower de-aggregation member that is from 20-40% of the length of the second blade portions of the paddles of the lower de-aggregation member.

3. The machine of claim 1 wherein each paddle comprises a blade portion and the blade portions of the first paddles have a length that is from 60-90% of the length of the blade portions of the second paddles.

4. The machine of claim 1 wherein each paddle comprises a blade portion and the blade portions of the first and second paddles have a leading face and the leading face of the blade portions of the first paddles face one of the end walls and the leading face of the blade portions of the second paddles face the other of the end walls.

5. The machine of claim 4 wherein the blade portions of the first and second paddles are alternately staggered.

6. The machine of claim 1 wherein each of the upper and lower de-aggregation members has a drive linkage and the drive linkages are configured such that the upper de-aggregation member rotates at a slower rate than the lower de-aggregation member.

7. The machine of claim 1 further comprising a first drive member connecting the motor to the lower de-aggregation member on the first side of the machine, a second drive member connecting the lower de-aggregation member to the upper de-aggregation member on the first side of the machine and a third drive member positioned on the second side of the machine connecting the lower de-aggregation member to the rotary valve.

8. The machine of claim 1 wherein the shaft of the lower de-aggregation member is offset in the forward/rearward direction from the shaft of the upper de-aggregation member and below the shaft of the upper de-aggregation member.

9. The machine of claim 1 wherein the upper de-aggregation member has an odd number of paddles and the lower de-aggregation member has an even number of paddles wherein the paddles of the upper and lower de-aggregation members are configured such that a paddle of the upper de-aggregation member extends between adjacent paddles of the lower de-aggregation member.

10. The machine of claim 1 wherein the rotary valve has an inlet positioned directly below the lower de-aggregation member.

11. The machine of claim 10 further comprising a choke, wherein the choke is configured to redirect some de-aggregated insulation upwardly to the lower de-aggregation member.

12. The machine of claim 11 wherein the choke is a variable choke.

13. The machine of claim 1 wherein the paddles comprising a mounting hub having a radial inner engagement surface, the engagement and seating surface are configured to position the paddles at fixed angular orientations on one of the shafts.

14. The machine of claim 1 wherein the discharge zone includes the rotary valve having a plurality of vanes, each vane comprising a rigid backbone and a flexible material provided thereon.

15. The machine of claim 1 wherein paddles having a shorter length are interspersed between paddles having a longer length.

16. the machine of claim 1 wherein the shaft of the upper de-aggregation member is laterally offset from the shaft of the lower de-aggregation member in the first direction.

\* \* \* \* \*